(12) United States Patent
Boyapalle et al.

(10) Patent No.: US 12,684,634 B2
(45) Date of Patent: Jul. 14, 2026

(54) METHOD AND APPARATUS FOR ENTERPRISE-CONTROLLED FLEET WIRELESS PERIPHERAL PAIRING

(71) Applicant: Dell Products, LP, Round Rock, TX (US)

(72) Inventors: Anantha K. Boyapalle, Cedar Park, TX (US); Kai Leong Wong, Singapore (SG); Nicholas D. Grobelny, Evergreen, CO (US)

(73) Assignee: DELL PRODUCTS LP, Round Rock, TX (US)

( * ) Notice: Subject to any disclaimer, the term of this patent is extended or adjusted under 35 U.S.C. 154(b) by 748 days.

(21) Appl. No.: 18/104,111

(22) Filed: Jan. 31, 2023

(65) Prior Publication Data

US 2024/0260104 A1    Aug. 1, 2024

(51) Int. Cl.
    *H04W 76/14*        (2018.01)
    *H04W 4/80*         (2018.01)
(52) U.S. Cl.
    CPC ............. *H04W 76/14* (2018.02); *H04W 4/80* (2018.02)
(58) Field of Classification Search
    CPC ...................................................... H04W 4/80
    See application file for complete search history.

(56) References Cited

U.S. PATENT DOCUMENTS 10,868,927 B1 * 12/2020 Kodimer ............ H04N 1/00511
11,012,227 B2    5/2021 Lim

| 11,102,653 | B2 | 8/2021 | Li | |
|---|---|---|---|---|
| 11,233,588 | B2 | 1/2022 | Nagata | |
| 2012/0179906 | A1* | 7/2012 | Choi | H04L 9/0891 |
| | | | | 713/155 |
| 2015/0304022 | A1* | 10/2015 | Murayama | H04B 7/26 |
| | | | | 455/41.2 |
| 2015/0312951 | A1* | 10/2015 | Locker | H04W 4/80 |
| | | | | 455/41.2 |
| 2016/0021116 | A1* | 1/2016 | Maguire | H04L 63/08 |
| | | | | 726/4 |

(Continued)

FOREIGN PATENT DOCUMENTS

WO        2017/207680 A1    12/2017

*Primary Examiner* — Wen W Huang

(74) *Attorney, Agent, or Firm* — Prol Intellectual Property Law, PLLC; H. Kenneth Prol

(57)                ABSTRACT

An information handling system includes a hardware processor and a memory device to execute code instructions of an automatic peripheral device pairing management system to generate or receive a temporary key and receive peripheral device identification (PD ID) for each of a plurality of ordered wireless peripheral devices (PDs). The hardware processor to receive from a peripheral device assignment agent, assignment instructions for the plurality of ordered PDs to a designated subset of managed information handling systems. The temporary keys to be stored on each corresponding ordered wireless PD and the hardware processor to also deliver each of the temporary keys and PD IDs associated with each of the plurality of the ordered wireless PDs to the designated subset of managed information handling systems for automatic querying, verification, and pairing of each of the plurality of wireless PDs with the designated subset of managed information handling systems.

20 Claims, 5 Drawing Sheets

(56)         References Cited

U.S. PATENT DOCUMENTS

| | | | |
|---|---|---|---|
| 2016/0099922 A1* | 4/2016 | Dover | H04L 9/0822 |
| | | | 713/171 |
| 2017/0026778 A1* | 1/2017 | Yamada | H04W 12/08 |
| 2017/0078300 A1* | 3/2017 | He | H04L 63/083 |
| 2018/0365449 A1 | 12/2018 | Meriac | |
| 2019/0273607 A1* | 9/2019 | Van Der Velden | H04L 9/088 |
| 2019/0306714 A1* | 10/2019 | Mai | H04W 12/041 |
| 2020/0052905 A1* | 2/2020 | Mathias | H04L 9/0861 |
| 2020/0336897 A1* | 10/2020 | Ledvina | H04W 12/041 |
| 2020/0344599 A1 | 10/2020 | Duo | |
| 2020/0344608 A1 | 10/2020 | Duo | |
| 2021/0227391 A1 | 7/2021 | Duo | |
| 2023/0021881 A1 | 1/2023 | Tate | |

* cited by examiner

Figure 2:
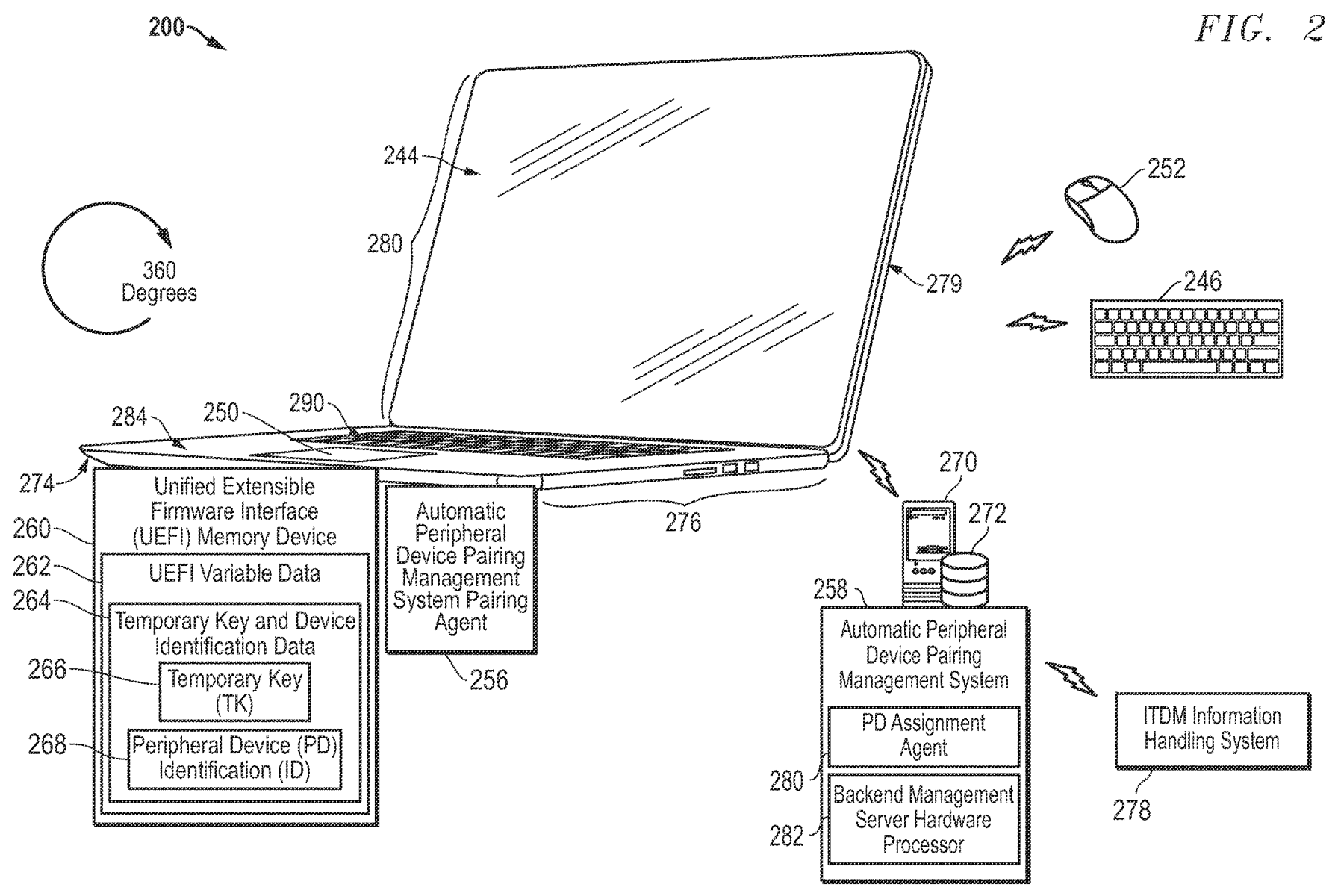

ITDM Information Handling System

278

Automatic Peripheral Device Pairing Management System

258

PD Assignment Agent

280

Backend Management Server Hardware Processor

282

276

244

280

Automatic Peripheral Device Pairing Management System Pairing Agent

256

290

250

Unified Extensible Firmware Interface (UEFI) Memory Device

284

UEFI Variable Data

Temporary Key and Device Identification Data

Temporary Key (TK)

Peripheral Device (PD) Identification (ID)

360 Degrees

274

260

262

264

266

268

METHOD AND APPARATUS FOR ENTERPRISE-CONTROLLED FLEET WIRELESS PERIPHERAL PAIRING

FIELD OF THE DISCLOSURE

The present disclosure generally relates to Bluetooth® pairing of a peripheral device with an information handling system. The present disclosure more specifically relates to automatic querying, verification, and pairing of a plurality of peripheral devices with one of a plurality of information handling systems managed by a backend management server.

BACKGROUND

As the value and use of information continues to increase, individuals and businesses seek additional ways to process and store information. One option available to clients is information handling systems. An information handling system generally processes, compiles, stores, and/or communicates information or data for business, personal, or other purposes thereby allowing clients to take advantage of the value of the information. Because technology and information handling needs and requirements vary between different clients or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific client or specific use, such as e-commerce, financial transaction processing, airline reservations, enterprise data storage, or global communications. In addition, information handling systems may include a variety of hardware and software components that may be configured to process, store, and communicate information and may include one or more computer systems, data storage systems, and networking systems. Still further, information handling systems may be operatively coupled to, via a pairing process, various peripheral devices that allow a user to interact with the information handling system.

BRIEF DESCRIPTION OF THE DRAWINGS

It will be appreciated that for simplicity and clarity of illustration, elements illustrated in the Figures are not necessarily drawn to scale. For example, the dimensions of some elements may be exaggerated relative to other elements. Embodiments incorporating teachings of the present disclosure are shown and described with respect to the drawings herein, in which:

FIG. 2 is a graphic diagram of a managed information handling system pairable with one or more wireless peripheral devices and operably coupled to, a backend management server and a managing information handling system according to an embodiment of the present disclosure;

The use of the same reference symbols in different drawings may indicate similar or identical items.

DETAILED DESCRIPTION OF THE DRAWINGS

Figure 1:
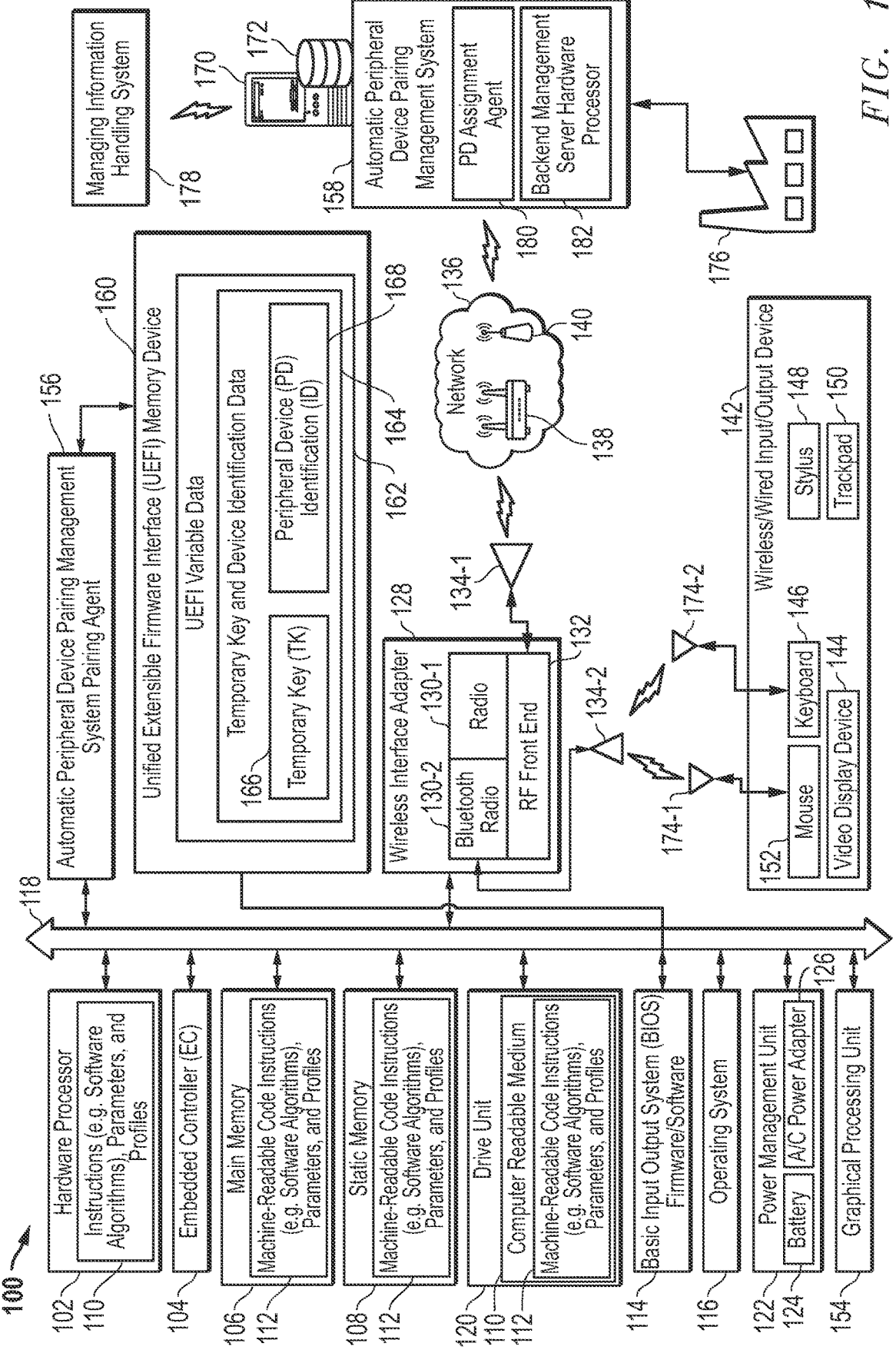
FIG. 1 is a block diagram of a managed information handling system and a backend managing server including a peripheral device (PD) pairing management system and PD assignment agent according to an embodiment of the present disclosure.

The following description in combination with the Figures is provided to assist in understanding the teachings disclosed herein. The description is focused on specific implementations and embodiments of the teachings, and is provided to assist in describing the teachings. This focus should not be interpreted as a limitation on the scope or applicability of the teachings.

Information handling systems operate to provide computing, data storage, and application resources among other computing resources. A plurality of peripheral devices (PDs) may be operatively coupled, wirelessly, to the information handling system such as via a Bluetooth® (BT) wireless protocols including Bluetooth Low-Energy (BLE) protocol. The wireless PDs allow the user to interact with the information handling system by receiving output and proving input to the information handling system. Some PDs may serve as both input and output devices. Although some PDs may have a wired connection with the information handling system, wireless PDs are operatively coupled to the information handling system via a radio of a wireless interface adapter in the information handling system and a radio located within the wireless PDs, for example BT wireless systems. In order to allow for the operative coupling of a wireless PD to the information handling system, the wireless PD may initiate a pairing process. This pairing process, in order for the operative coupling to be secure, includes security protocols that securely couple the wireless PD to the information handling system. This prevents the wireless PD from being operatively coupled to or hacked from information handling systems that are not associated with the user. In some instances, this requires the user to input certain pairing credentials such as a unique number in order to pair the wireless PD with the information handling system. Along with this pairing process requiring user input to initiate the pairing process (e.g., not being automatic), is not always entirely secure and could result in a third-party gaining control of the wireless PD using another information handling system with leak of a code or intercept of the pairing exchange. Further, such a manual pairing process can be cumbersome for users.

The present specification describes a backend management server with an optionally coupled managing information handling system used to assign a plurality of peripheral devices to managed information handling systems within an enterprise. In an embodiment, the backend management server includes a hardware processor to execute computer readable program code of an automatic peripheral device pairing management system to generate a temporary key and receive peripheral device identification (PD ID) for each of a plurality of wireless peripheral devices ordered by an information technology decision maker (ITDM). The hardware processor also executes the computer readable program code of the automatic peripheral device pairing management system to send the generated temporary keys to a manufacturer of each of the plurality of wireless peripheral devices for the manufacturer to cause each of the temporary keys to be stored on a corresponding memory device on each of the plurality of wireless peripheral devices. Further, the hardware processor receives, via execution of computer readable program code of a peripheral device assignment agent, an assignment for the plurality of wireless peripheral devices to a designated subset of managed information handling systems within an enterprise from selections made by an information technology decision maker (ITDM). In an embodiment, the hardware processor also executes the computer readable program code of the automatic peripheral device pairing management system to deliver each of the temporary keys and PD IDs associated with each of the plurality of the wireless peripheral devices to the designated subset of managed information handling systems to be used to automatically query, verify, and Bluetooth (BT) pair each of the plurality of wireless peripheral devices with managed information handling systems in the designated subset of managed information handling systems.

In an embodiment, the backend management server includes a network interface device to send instructions to the managed information handling system describing peripheral device verification requirements and including the temporary key and PD ID via a secured backend link. Still further, the hardware processor of the backend management server executes the computer readable program code of the automatic peripheral device pairing management system to generate the temporary key for each of the plurality of wireless peripheral devices via a hash function with a serial number of each of the associated peripheral devices used as seed data into the hash function. In other embodiments, the temporary keys may be generated at a peripheral device manufacturer and delivered to the backend management server.

In an embodiment, the hardware processor assigns the temporary keys and PD IDs associated with each of the plurality of peripheral devices ordered by the ITDM to all of the subset of managed information handling systems based on selection via the PD assignment agent to enable any managed information handling systems in the designated subset of managed information handling systems to automatically BT pair with any of the plurality of wireless peripheral devices. Additionally, in an embodiment, the hardware processor executes the computer readable program code of the managing information handling system to, via a network interface device, receive assignment instructions and send those assignment instructions via execution of code instructions of a peripheral device assignment agent to assign to each of the managed information handling systems in a designated subset of managed information handling systems pairing assignment availability with the one or more of the plurality of peripheral devices. Upon assignment instructions being received at the backend management server, the backend management server may send an received signal strength indicator (RSSI) threshold to the managed information handling systems such that any querying peripheral device from the plurality of peripheral devices providing an RSSI signal above a RSSI threshold level may begin automatic verification and pairing using the temporary keys and PD IDs associated with the plurality of wireless peripheral devices sent to the designated subset of managed information handling systems. In an embodiment, the backend management server transmits the temporary key and PD ID via an encrypted communication channel.

The ITDM may manage specific assignment of specific peripheral devices or groups of peripheral devices to any specific managed information handling system or a subgroup of managed information handling systems in a designated subset of managed information handling systems or to the entire designated subset of managed information handling systems. In an embodiment, the ITDM may, via execution of the PD assignment agent by the hardware processor at a managing information handling system or directly at the backend management server, select the designated subset or may select to exclude a number of the managed information handling systems of the designated subset of managed information handling systems from being assigned to any of the plurality of peripheral devices being assigned. The ITDM may, via execution of the PD assignment agent by the hardware processor, select to assign a single peripheral device of the plurality of peripheral devices to a managed information handling system of the designated subset of managed information handling systems or to a plurality of managed information handling systems in a sub-group of the designated subset of managed information handling systems in an embodiment. In an embodiment, the ITDM may, via execution of the PD assignment agent by the hardware processor, select to assign many peripheral devices of the plurality of peripheral devices to a single managed information handling system, any sub-grouping or all of the designated subset of managed information handling systems.

FIG. 1 illustrates an information handling system 100, similar to information handling systems according to several aspects of the present disclosure including a managed information handling system 100. It is contemplated that several of the hardware components and the aspects shown of the information handling system 100 may also apply to a backend management server 170 or an ITDM managing information handling system 178. For example, the ITDM information handling system 178 or the backend management server 170 may execute code instructions of a PD assignment agent 180 via a hardware processor such as 102 according to an embodiment. The backend management server 170 also executes code instructions of an automatic peripheral device pairing management system 158 via a hardware processor such as 102 according to embodiments herein. The managed information handling system 100 executes, with a hardware processor 102, embedded controller 104, or other hardware processing resources, an automatic PD pairing management system pairing agent 156 that may interface with a backend management server 170 executing code instructions of the automatic peripheral device pairing management system 158 in the embodiments described herein to facilitate this assignment of the peripheral device (PD) 142 to the managed information handling system 100. In the embodiments described herein, the managed information handling system 100 or other information handling systems described herein includes any instrumentality or aggregate of instrumentalities operable to compute, classify, process, transmit, receive, retrieve, originate, switch, store, display, manifest, detect, record, reproduce, handle, or use any form of information, intelligence, or data for business, scientific, control, entertainment, or other purposes. For example, the managed information handling system 100 or other information handling system described herein can be a personal computer, mobile device (e.g., personal digital assistant (PDA) or smart phone), server (e.g., blade server or rack server), a consumer electronic device, a network server or storage device, a network router, switch, or bridge, wireless router, or other network communication device, a network connected device (cellular telephone, tablet device, etc.), IoT computing device, wearable computing device, a set-top box (STB), a mobile information handling system, a palmtop computer, a laptop computer, a desktop computer, a convertible laptop, a two-in-one computer, a tablet, a smartphone, a communications device, an access point (AP), a base station transceiver, a wireless telephone, a control system, a camera, a scanner, a printer, a personal trusted device, a web appliance, or any other suitable machine capable of executing a set of machine-readable code instructions (sequential or otherwise) that specify actions to be taken by that machine, and can vary in size, shape, performance, price, and functionality.

In a networked deployment, the managed information handling system 100, the backend management server 170, or the ITDM information handling system 178 may operate in the capacity of a server or as a client computer in a server-client network environment, or as a peer computer system in a peer-to-peer (or distributed) network environment. In a particular embodiment, the managed information handling system 100, the backend management server 170, or the ITDM information handling system 178 can be implemented using electronic devices that provide voice, video, or data communication. For example, a managed information handling system 100, the backend management server 170, or the ITDM information handling system 178 may be any mobile or other computing device capable of executing, via a hardware processing resource, a set of machine-readable code instructions (sequential or otherwise) that specify actions to be taken by that machine. In an embodiment, the managed information handling system 100 may be operatively coupled to a server such as the backend management server 170 or other network device as well as with any wireless peripheral devices 142. Further, while a single managed information handling system 100 is illustrated, the term "system" shall also be taken to include any collection of hardware systems or hardware sub-systems that individually or jointly utilize one or more hardware processing resources to execute a set, or multiple sets, of machine-readable code instructions to perform one or more computer functions.

The managed information handling system 100 may include memory (volatile (e.g., random-access memory, etc.), nonvolatile (read-only memory, flash memory etc.) or any combination thereof), one or more hardware processing resources, such as a hardware processor 102, a central processing unit (CPU), a graphics processing unit (GPU) 154, an embedded controller (EC) 104, other hardware processing device, hardware controller, or any combination thereof. Additional components of the managed information handling system 100 can include one or more storage devices, one or more communications ports for communicating with external devices, as well as various input and output (I/O) devices 142, such as a keyboard 146, a mouse 152, a video display device 144, a stylus 148, a trackpad 150, or any combination thereof. The managed information handling system 100 can also include one or more buses 118 operable to transmit data communications between the various hardware components described herein. Portions of a managed information handling system 100 may themselves be considered information handling systems and some or all of which may be wireless. It is appreciated, as well, that the structure and hardware of the managed information handling system 100 described herein may also apply to the backend management server 170 or the ITDM information handling system 178. For purposes of the present specification, the managed information handling system 100 is used to communicate with the backend management server 170 which generates and securely transmits to the managed information handling system 100 a temporary key (TK) 166 and peripheral device identification (PD ID) for automatic verification and BT pairing with one or more wireless PDs 142. An ITDM managing information handling system 178 may use the code instructions of a PD assignment agent 180 also operating at the backend management server 170 as well as at the managing information handling system 178 to provide instructions to the backend management server 170 regarding which wireless peripheral devices (PDs) are assigned to which managed information handling systems 100. For purposes of the present specification, a managed information handling system 100 includes those information handling systems that receive a temporary key (TK) 166 and PD ID 168 used to query, verify, and Bluetooth® (BT) pair a wireless PD to the managed information handling system 100. It is understood that the TK 166 may be a type of cryptographic key in various embodiments that may be used with a confirm value generation function or other cipher algorithm to confirm the TK 166 is the same between a managed information handling system 100 and a wireless PD 142 to be paired. Such a TK is also stored by manufacturer 176 on memory on the wireless PDs 142. As such, the backend management server 170 and the backend management server database 172 may securely transmit a TK 166 and PD ID 168 of the temporary key and device identification data 164 to the managed information handling system 100 for automatic querying, verification, and BT pairing with a wireless PD (e.g., a wireless mouse 152, a wireless video display device 144, a wireless keyboard 146, a wireless trackpad 150, and a wireless stylus 148, among other wireless PDs) having a matching PDID 168 and a PD temporary key that is a copy of the TK 166. Although FIG. 1 shows a single managed information handling system 100, the present specification contemplates that multiple managed information handling systems 100 may be operatively coupled to the backend management server 170.

The managed information handling system 100, the backend management server 170, or the ITDM information handling system 178 can include devices or modules that embody one or more of the hardware devices or hardware processing resources to execute machine-readable code instructions for the one or more systems and modules described above and operates to perform one or more of the methods described herein. For example, machine-readable code instructions may be executed by an EC 104, the hardware processor 102, or other hardware processing resource of a backend management server 170 for an automatic peripheral device pairing management system 158 or execute instructions of an PD assignment agent 180 in an embodiment. A hardware processor 102 at the managed information handling system 100 to control the discovery, verification, and initialization of BT pairing of a wireless PD to a managed information handling system 100 may execute code instructions of the automatic peripheral device pairing management system pairing agent 156 with an OS BT stack (not shown) as described in embodiments herein. The managed information handling system 100 may include machine-readable code instructions, parameters, and profiles 112 executed via hardware processing resources that may operate on servers or systems, remote data centers, or on-box in individual client information handling systems according to various embodiments herein. In some embodiments, it is understood any or all portions of machine-readable code instructions, parameters, and profiles 112 may operate on a plurality of information handling systems 100.

The managed information handling system 100, the backend management server 170, or the ITDM information handling system 178 may include hardware processing resources such as a hardware processor 102, a central processing unit (CPU), accelerated processing unit (APU), a neural processing unit (NPU), a vision processing unit (VPU), the EC 104, a digital signal processor (DSP), a graphical processing unit (GPU) 154, a microcontroller, or any other type of hardware processing device that executes machine-readable code instructions to perform the processes described herein. Any of the hardware processing resources may operate to execute code that is either firmware or software code. Moreover, the managed information handling system 100, the backend management server 170, or the ITDM information handling system 178 can include memory such as main memory 104, static memory 108, and drive unit 120 (volatile (e.g., random-access memory, etc.), nonvolatile (read-only memory, flash memory etc.) or any combination thereof) that stores machine-readable code instructions, parameters, and profiles 112 including machine-readable code instructions, parameters, and profiles 112 of, in an example embodiment, an PD assignment agent 180 or other computer executable program code as described in embodiments herein. In embodiments described herein, computer-readable program code associated with the automatic PD pairing management system pairing agent 156, the automatic peripheral device pairing management system 158, or the PD assignment agent 180 may be stored on non-volatile memory such as main memory 104 and may be made to be accessible by a hardware processing device such as an EC 104 or the hardware processor 102 for execution. In one example embodiment, an information handling system may operate, in whole or in part, as a backend management server 170 with hardware processing resources executing code instructions of an automatic peripheral device pairing management system 158 according to embodiments herein.

As shown, the managed information handling system 100, the backend management server 170, or the ITDM information handling system 178 may further include a video display device 144. The video display device 144, in an embodiment, may function as a liquid crystal display (LCD), an organic light emitting diode (OLED), a flat panel display, or a solid-state display. Although FIG. 1 shows a single video display device 144, the present specification contemplates that multiple video display devices 144 may be used with the managed information handling system 100, the backend management server 170, or the ITDM information handling system 178 to facilitate an extended desktop scenario, for example. In an embodiment, the video display device 144 may be used as an output device that allows the user to interact with the managed information handling system 100, the backend management server 170, or the ITDM information handling system 178. In one embodiment, the video display device 144 may be BT wirelessly coupled to the managed information handling system 100 via the methods described herein and via execution of the automatic PD pairing management system pairing agent 156 and an OS BT stack by a hardware processing resource (e.g., EC 104, hardware processor 102, etc.).

Additionally, the managed information handling system 100 may include one or more input/output devices 142 that may be wireless or wired including an alpha numeric input device such as a keyboard 146 and/or a cursor control device, such as a mouse 152, touchpad/trackpad 150, a stylus 148, or a gesture or touch screen input device associated with the video display device 144 that allow a user to interact with the images, windows, and applications presented to the user. In an embodiment, the video display device 144 may provide output to a user that includes, for example, one or more windows describing one or more instances of applications being executed by the hardware processor 102 of the information handling system.

In one example embodiment, a window may be presented to the user that provides a graphical user interface (GUI) representing the execution of that application. In an embodiment, a GUI may be presented to a user on the video display device such as 144 of the managed information handling system 100 that allows a user (e.g., an ITDM) to select from a plurality of managed information handling systems 100 in any designated subset or combination of subsets to be assigned new wireless peripheral devices 142 among a plurality of ordered wireless PDs 142 with execution of the PD assignment agent 180 at the ITDM information handling system 178 or backend management server 170 and the execution of the automatic peripheral device pairing management system 158 at the backend management server 170 as described herein. The present disclosure contemplates that any of these input/output devices 142 may be a wireless PD 142 ordered by and to be used by the user with the managed information handling system 100 or ordered by an ITDM operating the managed information handling system 100 or at the backend management server 170. For example, an ITDM may order one or a plurality of new wireless mice 152 to be shipped to the user's location and to be BT paired for use with the managed information handling system 100 or any designated subset of managed information handling systems 100 as a wireless input/output device 142. The methods and systems described herein allow for a streamlined discovery, verification, and initialization of BT automatic pairing of the new wireless PDs 142 (e.g., wireless mouse 152) to any subset of the managed information handling systems 100 in a secure manner.

The managed information handling system 100, the backend management server 170, or the ITDM information handling system 178 may further include a network interface device. The network interface device may be a wired network interface card in some embodiments. The network interface device of the managed information handling system 100 as shown may also be a wireless interface adapter 128 according to another embodiment and can provide wireless connectivity among devices (e.g., wireless PDs 142 such as the input/output devices 142) such as with Bluetooth® (BT) as well as wired network connectivity. Wired or wireless connectivity to a network 136 via a network interface device using, e.g., a wide area network (WAN), a local area network (LAN), wireless local area network (WLAN), a wireless personal area network (WPAN), a wireless wide area network (WWAN), or other network is contemplated in embodiments herein. In an embodiment, the WAN, WWAN, LAN, and WLAN may each include an access point 138 or base station 140 used to operatively couple the managed information handling system 100 to a network 136. In a specific embodiment, the network 136 may include macro-cellular connections via one or more base stations 138 or a wireless access point 138 (e.g., Wi-Fi or WiGig), or such as through licensed or unlicensed WWAN small cell base stations 138. Connectivity may be via wired or wireless connection. For example, wireless network access points 136 or base stations 138 may be operatively connected to the managed information handling system 100. Wireless interface adapter 128 may include one or more radio frequency (RF) subsystems (e.g., radio 130-1, 130-2) with transmitter/receiver circuitry, modem circuitry, one or more antenna front end circuits 132, one or more wireless controller circuits, amplifiers, antennas 134-1, 134-2 and other circuitry of the radio 130-1, 130-2 such as one or more antenna ports used for wireless communications via multiple radio access technologies (RATs). The radio 130-1, 130-2 may communicate with one or more wireless technology protocols. In one embodiment, the radio 130-1 operating as a WWAN module may contain individual subscriber identity module (SIM) profiles for each technology service provider and their available protocols for any operating subscriber-based radio access technologies such as cellular LTE communications. It is appreciated that the radios 130-1, 130-2 may be any type of wireless module operatively coupled to the RF front end 132 via, for example, I2C lines. These modules forming the radios 130-1, 130-2 include a WWAN module (e.g., radio 130-1), a WLAN module, a Bluetooth module (e.g., 130-2) or any other wireless protocol module used to operatively couple the managed information handling system 100 to a network or to the wireless PDs 142 as described herein. It is appreciated that the backend management server 170 or ITDM information handling system 178 may also include a wireless interface adapter and radios similar to those of the managed information handling system 100 shown as well as wired network interface devices in order to allow for the managed information handling system 100 to be operatively coupled to the backend management server 170 or the backend management server 170 to be operatively coupled to the ITDM managing information handling system 178 or systems at a peripheral device manufacturer 176 to receive data on the ordered peripheral devices 142 as described herein.

In an example embodiment, the wireless interface adapter 128, radio 130-1, 130-2, and antenna 134-1, 134-2 may provide connectivity to one or more of the wireless peripheral devices 142 that may include a wireless video display device 144, a wireless keyboard 146, a wireless mouse 152, a wireless headset, a microphone, a wireless stylus 148, and a wireless trackpad 150, among other wireless peripheral devices used as input/output (I/O) devices 142.

It is appreciated that these various radios 130-1, 130-2 may be each coupled to an antenna 134-1, 134-2 via the RF front end 132. In an embodiment, the wireless interface adapter 128 may include any number of antennas 134-1, 134-2 which may include any number of tunable antennas for use with the system and methods disclosed herein. Although FIG. 1 shows two antennas 134-1, 134-2, the present specification contemplates that the number of antennas 134-1, 134-2 may include more or less of the number of individual antennas shown in FIG. 1. Additional antenna system modification circuitry (not shown) may also be included with the wireless interface adapter 128 to implement coexistence control measures via an antenna controller in various embodiments of the present disclosure.

In some aspects of the present disclosure, the wireless interface adapter 128 may operate two or more wireless links. In an embodiment, the wireless interface adapter 128 may operate a Bluetooth® wireless link (e.g., via Bluetooth radio 130-2 and antenna 134-2) using a Bluetooth® wireless or Bluetooth® Low Energy (BLE). In an embodiment, the Bluetooth® wireless protocol may operate at frequencies between 2.402 to 2.48 GHz.

The wireless interface adapter 128 may operate in accordance with any wireless data communication standards. To communicate with a wireless local area network, for example, standards including IEEE 802.11 WLAN standards (e.g., IEEE 802.11ax-2021 (Wi-Fi 6E, 6 GHz)), IEEE 802.15 WPAN standards, WWAN such as 3GPP or 3GPP2, Bluetooth® standards, or similar wireless standards may be used. Wireless interface adapter 128 may connect to any combination of macro-cellular wireless connections including 2G, 2.5G, 3G, 4G, 5G or the like from one or more service providers. Utilization of radio frequency communication bands according to several example embodiments of the present disclosure may include bands used with the WLAN standards and WWAN carriers which may operate in both licensed and unlicensed spectrums.

The wireless interface adapter 128 can represent an add-in card, a wired network interface, or a wireless network interface module that is integrated with a main board of the managed information handling system 100 (and backend management server 170 and ITDM information handling system 178 in embodiments herein) or integrated with another wireless network interface capability, wired network interface capability, or any combination thereof. As described herein, a network interface device may include a wireless interface adapter 128 or a wired network interface card. In an embodiment the wireless interface adapter 128 may include one or more radio frequency subsystems including transmitters and wireless controllers for connecting via a multitude of wireless links. In an example embodiment, a managed information handling system 100 may have an antenna system transmitter for Bluetooth®, BLE, 5G small cell WWAN, or Wi-Fi WLAN connectivity and one or more additional antenna system transmitters for macro-cellular communication. The RF subsystems and radios 130-1, 130-2 include wireless controllers to manage authentication, connectivity, communications, power levels for transmission, buffering, error correction, baseband processing, and other functions of the wireless interface adapter 128.

As described herein, the ITDM managing information handling system 178 may execute or be operatively coupled to a PD assignment agent 180 at the backend management server 170 that, when executed by a hardware processor 102, an EC 104, or other hardware processing resource, manages the assignment of PDs to individual managed information handling systems 100 within any subset of managed information handling systems 100. The PD assignment agent 180, when executed by such hardware processing resources may cause assignment instructions to be transmitted to the automatic peripheral device pairing management system 158 executed by a backend management server hardware processor 182 on the backend management server 170 for the backend management server 170 to provide the temporary key and device identification data 164 generated there or at the manufacturer 176 to each of the managed information handling systems 100 in the designated subset of managed information handling systems 100 identified with the PD assignment agent 180 that are available to BT pair with assigned wireless PDs 142 or a plurality of assigned wireless PDs 142. The managed information handling system 100 may then engage in a pairing query for automatic verification, and initiation of BT pairing to pair with the assigned wireless PD 142 via execution of the automatic PD pairing management system pairing agent 156 with an OS BT stack as described herein.

In an embodiment, the ITDM managing information handling system 178 or backend management server 170, via the execution of the PD assignment agent 180 by the hardware processing resources (e.g., backend management server hardware processor 182), may direct which of a plurality of ordered PDs 142 are to be assignable to and eventually paired with which of a plurality of managed information handling systems 100 as a designated subset when more than one PD 142 is to be assigned to one or more managed information handling systems 100. In an embodiment, the user of the ITDM information handling system 178 or backend management server 170 may be an ITDM that has ordered one or more PDs 142 to be assigned to one or more managed information handling systems 100 or a subset or group of managed information handling systems 100 within, for example, an enterprise or corporation. In another embodiment, the user of the managed information handling system 100 may be the purchaser of the PD 142 and the execution of the PD assignment agent 180 on the backend management server 170 or ITDM information handling system 178 allows this user to assign the ordered PD 142 or PDs 142 to the managed information handling system 100.

The hardware processor resource (e.g., backend management server hardware processor 182) of the backend management server 170 executes the computer readable program code of the PD assignment agent 180 to assign one or more PDs 142 to one or more managed information handling systems 100. In an embodiment, execution of the PD assignment agent 180 may monitor for and receive an assignment instruction, such as from an ITDM, that a peripheral device identification (PD ID) 168 has been assigned to a purchased PD 142 to be BT paired with a managed information handling system 100 or a group of managed information handling systems 100 in a designated subset. In an embodiment, this PD ID 168 may be a serial number assigned to the PD 142 by the PD manufacturer 176, however the present specification contemplates that any type of identification data may be used as the PD ID 168. In an embodiment, the backend management server 170 is presented with the PD ID 168 from a PD manufacturer 176 of the wireless PDs 142 or a third-party website that sells the wireless PDs 142, among other potential sources. Along with the PD IDs 168 the PD manufacturer 176 or third party may also provide data descriptive of the purchaser of the wireless PD 142. The PD manufacturer 176 or third party provides these PD IDs 168 to the backend management server 170 and the backend management server 170 may, upon execution of the automatic PD pairing management system 158 by the backend management server hardware processor 182, cross-reference the purchaser, via the data descriptive of the purchaser of the wireless PD 142, with a managed information handling system 100 or a plurality of managed information handling systems 100 used by the purchaser of the wireless PD 142. By correlating the purchase of the wireless PD 142 by purchaser with the purchaser's managed information handling system 100, the backend management server 170 can store this data at the backed management server database or storage 172 for later distribution to a corresponding managed information handling systems 100.

When the backend management server 170 has received the PD ID 168, the PD assignment agent 180 of the ITDM managing information handling system 178 may be used by, for example, an ITDM or user to assign that PD 142 with its corresponding PD ID 168 to be assigned with a specific managed information handling system 100 or with a specific group of managed information handling systems 100. The execution of the PD assignment agent 180, in whole or in part, at the backend management server 170 allows a user to provide instructions to the backend management server database 172 regarding which managed information handling system 100 is to be paired with the ordered PD 142. In an embodiment, the user of the managed information handling system 100 or the ITDM operating the ITDM information handling system 178 may access a GUI to provide instructions to the backend management server 170 to assign the PD 142 or PDs to be paired with a managed information handling system 100 or a plurality of managed information handling systems 100.

In addition to receiving assignment instruction data at the backend management server 170, the backend management server 170 may obtain a TK 166 to be associated with each of the PDs 142 and their respective PD IDs 168. In an embodiment, where the TK 166 has not been obtained by the backend management server database 172 from the PD manufacturer 176, the backend management server 170, using a hardware processor 182, may generate a TK 166 to also be stored with specific PD IDs 168 and purchaser/user information associated with each ordered PD 142. Creation of the TK 166 may be accomplished, in an embodiment, by executing a random number generator, a hash function, a cryptographic hash function, or any other cryptographic key generating algorithm that creates a unique TK 166 using unique seed data to be associated with the wireless PD 142 and its PD ID 168. The execution of the random number generator, the hash function, the cryptographic hash function, or other cryptographic key generating algorithms may be done by a hardware processor of the backend management server 170 in an embodiment. When the TK 166 is generated, the backend management server 170 may provide a copy to the PD manufacturer 176 via a secure connection for storage on the wireless PDs 142 as a PT temporary key. In another embodiment, along with providing the PD ID 168 to the backend management server 170, the PD manufacturer 176 may generate and provide the TK 166 as well. In this embodiment where the PD manufacturer 176 provides the TK 166, the PD manufacturer 176, with a hardware processing resource, may execute the random number generator, hash function, cryptographic hash function, or any other cryptographic key generating algorithm to generate the unique TK 166 using unique seed data to be associated with the wireless PD 142 and its PD ID 168. The manufacturer may also store a copy PT temporary key on the memory of the wireless PDs it manufactures and ships.

The execution of the PD assignment agent 180 by the hardware processing resource on the backend management server 170 may further cause the temporary key and device identification data 164 (e.g., PD ID 168 and TK 166) to be directed to the managed information handling system 100 or group of managed information handling systems 100 pursuant to the assignment instructions received. As described herein, the managed information handling system 100 may use this TK 166 and PD ID 168 to automatically query, verify, and BT pair at least one of the ordered wireless PDs 142 to the managed information handling system 100 if the PD ID's 168 are determined to match and the TK 166 matches the PD temporary key stored on the PD 142.

The method of automatic query response, verification, and initiation of BT pairing of the wireless PD 142 to the managed information handling system 100 includes receiving temporary key and device identification data 164 from the backend management server 170 by an automatic PD pairing management system pairing agent 156 on the managed information handling system 100. The automatic PD pairing management system pairing agent 156 may be computer readable program code that, when executed by a hardware processing resource of the managed information handling system 100, communicates with the backend management server 170, and retrieves the PD ID 168 and TK 166. This temporary key and device identification data 164 may match peripheral device temporary key and device identification data 164 placed on a storage device of the PD 142 to be paired with the managed information handling system 100 when code instructions of the automatic peripheral device pairing management system pairing agent 156 are executed. These symmetric TKs 166 and PD IDs 168 stored by the managed information handling system 100 and stored on the wireless peripheral device 142 allow for the automatic query response, verification, and initiation of BT pairing process described herein to be completed. In an embodiment, the managed information handling system 100 is communicatively coupled to a backend management server 170 that hosts a backend management server database 172 used to store TKs 166 and PD IDs 168 associated with one or more wireless peripheral devices 142 as described herein.

In an embodiment, the TKs 166 and PD IDs 168 stored on the backend management server database 172 are assigned to specific wireless PDs 142 by execution of the PD assignment agent 180 of the backend management server 170 upon purchase of the same as described herein and may be assigned to one or more of a designated subset of managed information handling systems 100. In another embodiment, the TKs 166 and PD IDs 168 stored on the backend management server database 172 are assigned by operation of the PD assignment agent 180 executed on the backend management server 170 and accessed by the ITDM information handling system 178. The execution of the PD assignment agent 180 allows, for example, the ITDM to assign a plurality of wireless PDs 142 to one of many possible managed information handling systems 100 either associated with a specific user or specific group of users as described herein.

By way of example, a PD manufacturer 176 may manufacture a plurality of wireless mice 152 or any other type of wireless PD 142. The PD manufacturer 176 may assign a PD ID 168 to the each of the wireless PDs 142 (e.g., a serial number associated with each of the wireless PDs 142) and store each of the PD IDs 168 on a memory device located on each of the wireless PDs 142. As described herein, the PD manufacturer 176 or, alternatively, the backend management server 170 may also generate a TK 166 used later in the method to query, verify, and pair each of the wireless PDs 142 with one or more managed information handling systems 100. In an embodiment, the TK 166 generated by the PD manufacturer 176 or the backend management server 170 for each wireless PD 142 is also stored on a memory device located on each associated wireless PD 142 prior to the wireless PDs 142 being shipped to the users, enterprise, or organization as described herein. The memory device on the wireless PDs 142 may be any type of non-volatile memory that stores the associated PD ID 168 and TK 166 until the wireless PDs 142 are turned on by the purchaser/ user and a pairing process is started with the managed information handling system 100 executing, with a hardware processor the automatic PD pairing management system pairing agent 156. It is appreciated that the purchaser of the wireless PD 142 or the plurality of wireless PDs 142 in some embodiments herein may be the end user. It is further appreciated that the purchaser of the wireless PD 142 or plurality of wireless PDs 142 may be a third party purchasing the wireless PDs 142 on behalf of a user of the managed information handling system 100 such as the ITDM described herein.

In another embodiment, the PD manufacturer 176 may cause the PD IDs 168 to be stored on the memory device within each of the wireless PDs 142 and transmit the PD IDs 168 to the backend management server 170 without generated TKs 166 (e.g., the TK 166 to be generated at the backend management server 170 instead). In an embodiment, further data accompanying the copy of the PD ID 168 may include data describing the purchaser/user. The data describing the purchaser/user may include a street address, purchase date, a purchaser identification, and other information that allows the backend management server 170 to determine if and which managed information handling systems 100 listed within the backend management server database 172 is owned by the purchaser/user of the wireless PD 142 or plurality of wireless PDs 142. When the backend management server 170 receives the PD ID 168 associated with the recently purchased wireless PD 142, the hardware processing resources (e.g., backend management server hardware processor 182) on the backend management server 170 may identify the user, determine whether a managed information handling systems 100 or a plurality of managed information handling systems 100 are associated with the user/enterprise based on the data describing the purchaser/ user, and store the correlated PD ID 168 with the purchaser/ user in the backend management server database 172. The backend management server 170 may also notify, for example, an ITDM that the wireless PDs 142 have been purchased and that the PD IDs 168 have been associated with each of the wireless PDs 142. The backend management server 170 may then, via execution of the PD assignment agent 180, receive assignment instructions indicating that the one or more wireless PDs 142 are to be assigned to the managed information handling system 100 or plurality of managed information handling systems 100 as described herein.

Again, it is appreciated that the purchaser may be a purchaser of multiple wireless PDs 142 to be used on one or a plurality of managed information handling systems 100. For example, ITDMs or other IT professionals within an organization or enterprise may be tasked to purchase bulk or specific wireless PDs 142 for those managed information handling systems 100 the ITDM is responsible for. The ITDM may order a plurality of wireless PDs 142 to be assigned to one or a plurality of information handling systems operated by specific users within, for example, an enterprise. In this embodiment, the PD ID 168 data may include a plurality of sets of PD IDs 168 so that any given wireless PD 142 may be paired with any of the plurality of managed information handling systems in a designated set of managed information handling systems. When a user within the enterprise turns the wireless PD 142 on then an automatic verification and BT pairing process described herein is initiated. By operation of the PD assignment agent 180 executed by a hardware processing resource on the backend management server 170, the ITDM may provide instructions to the backend management server 170 to deliver the plurality of sets of PD IDs 168 and TKs 166 to all of the plurality of managed information handling systems 100 in some embodiments. In this example, correlated TKs 166 may be matched up with encrypted messages exchanged and decrypted upon matching PD IDs 168 from a querying PD 12 to verify that, regardless of the user or managed information handling system 100, one of the ordered wireless PDs 142 may initiate BT pairing with one of the managed information handling system 100 within, for example, an enterprise.

When the PD ID 168, correlated TK 166, and user information has been stored on the backend management server database 172, the backend management server 170 may execute the automatic peripheral device pairing management system 158 to provide this data to one or more managed information handling systems 100 that the wireless PDs 142 are to be paired with. For example, where a single user has ordered a wireless PD, the backend management server 170 may fulfill a request for the PD ID 168 and TK 166 data associated with the user's managed information handling system 100 to be sent to that user's managed information handling system 100 via a secure wireless link. Here, the user may operate a ITDM information handling system 178, in one example embodiment, to provide instructions that cause the data to be uploaded to the user's managed information handling system 100. In another example where multiple wireless PDs 142 have been ordered, one or more PD IDs 168 and correlated TKs 166 may be sent to each of a plurality of the managed information handling systems 100 in a group or to a specific managed information handling system 100 for use within a designated subset of managed information handling systems 100. In an embodiment, because the ITDM is provided with access to the backend management server 170 to assign specific wireless PDs 142 out of a plurality of ordered wireless PDs 142 to specific users and their respective managed information handling systems 100, the ITDM is assured that only a specific wireless PDs 142 may be automatically verified and BT paired with a specific managed information handling systems 100 or groups of managed information handling systems 100, even when multiple wireless PDs 142 are turned on at or near any specific managed information handling system 100. That the TK 166 and PD temporary key copy stored on the wireless PD 142 are one-time use in some embodiments, for example deleted after use, provides added assurance that a purchased wireless PD 142 is pairable to a designated subset or group of managed information handling systems 100, but only actually automatically pairs with a single managed information handling system 100 in the subset or group.

In an embodiment, the individual managed information handling systems 100 may request any potential PD ID 168 and TK 166 periodically. For example, a software agent (e.g., Dell® SupportAssist®) of the managed information handling systems 100 may periodically send requests to the backend management server 170 for any potential PD ID 168 and TK 166 now assigned by the backend management server 170/ITDM to the user's managed information handling system 100. In an embodiment, those managed information handling systems 100 identified by the backend management server 170 as being associated with a specific user or user group may be described as a managed device that uses a software agent such as an automatic peripheral device pairing management system pairing agent 156 executed by a hardware processor of the managed information handling system 100 to receive updates, software packages and the temporary key and device identification data 164 as described herein. Additionally, or alternatively, computer readable program code executed by a hardware processor on the backend management server 170 may detect that the managed information handling system 100 is online and push the PD ID 168 and TK 166 to the managed information handling system 100. As such the managed information handling system 100 may be operatively coupled to the backend management server 170 via the network 136 using a wireless connection, a wired connection, or a combination of wired and wireless connections so that the PD ID 168 and TK 166 may be sent to and received at the managed information handling system 100.

As each of the managed information handling systems 100 (e.g., the managed information handling system 100 shown in FIG. 1) receives the temporary key and device identification data 164 (e.g., TK 166 and PD ID 168), the PD ID 168 and TK 166 may be stored in unified extensible firmware interface (UEFI) memory device 160 as UEFI variable data 162 or stored in other memory devices in various embodiments. In an embodiment, the managed information handling system 100 may send such instructions to the backend management server 170 in order to direct the managed information handling systems 100 to store the PD ID 168 and TK 166 on the UEFI memory device 160. The UEFI memory device 160 on the managed information handling system 100 may be any memory device that maintains the PD ID 168 and TK 166 for later retrieval by an operating system (OS) Bluetooth stack under direction of a hardware processor in one embodiment. In an embodiment, the UEFI variable data 162 is stored on a flash memory device associated with the basic input/output system (BIOS) 114.

In an embodiment, the Bluetooth stack includes computer executable program code with hardware that, when executed by a hardware processor (e.g., hardware processor 102, embedded controller 104, or any other hardware processing resource) along with code instructions of the automatic peripheral device pairing management system pairing agent 156 of the managed information handling system 100, performs automatic querying, verification, and initiation of BT pairing operations between the managed information handling system 100 and wireless PD 142, and controls operations of a Bluetooth radio 130-2 under any BT protocols, among other functions. A plurality of protocols may be present in the Bluetooth stack which may include core protocols including Bluetooth radio, baseband, link manage protocol, logical link control and adaptation protocol, and service discovery protocols. Further, the protocols present with the Bluetooth stack include adopted protocols such as those protocols adopted from standard models (e.g., Point-to-Point Protocol, Internet Protocol, User Datagram Protocol, Transmission Control Protocol, and Wireless Application Protocol). Attention command sets may also be part of the protocols associated with the Bluetooth stack. Physical layers of the Bluetooth stack also include a radio (e.g., Bluetooth radio 130-2) used to transmit radio waves at a specific frequency as described herein. The frequency with which the Bluetooth stack of the Bluetooth radio 130-2 queries the UEFI variable data 162 to determine if temporary key and device identification data 164 is available may vary. In an embodiment, the Bluetooth stack may query the UEFI memory device 160 for the UEFI variable data 162 during every power up of the managed information handling system 100. In an embodiment, the Bluetooth stack may query the UEFI variable data 162 on the UEFI memory device 160 a plurality of times when the managed information handling system 100 is powered up.

As the backend management server 170 receives the temporary key and device identification data 164 from the PD manufacturer 176 of the wireless PD 142, the PD manufacturer 176 of the wireless PD 142 may ship the wireless PD 142 to the user (e.g., ITDM or user of the managed information handling system 100). The shipping of the wireless PD 142 to the end user may happen concurrently as the backend management server 170 correlates the PD ID 168 and a generated TK 166 with the user's identity and the managed information handling system 100 operated by the user. Thus, in an embodiment, the temporary key and device identification data 164 may be relayed to the managed information handling system 100 prior to the user receiving, via shipment, the wireless PD 142. This allows the automatic peripheral device pairing management system pairing agent 156 of the managed information handling system 100 to, with the Bluetooth stack, retrieve the TK 166 and PD ID 168 in preparation for automatic querying, verification, and initiation of BT pairing the wireless PD 142 (e.g., a wireless mouse 152) with the managed information handling system 100.

As the user receives the wireless PD 142 from the manufacturer 176, the user may power up the wireless PD 142. In the example of the wireless mouse 152, this may include moving a power switch to an on position. The powering on of the wireless PD 142 causes the wireless PD 142 to broadcast signal via an out of band (OOB) BT broadcast wireless channel that indicates availability of the wireless PD 142 to pair and includes a pairing request. In the embodiments herein, this broadcast signal from the wireless PD 142 includes the PD ID 168 stored in the non-volatile memory device by the PD manufacturer 176 as described herein. The Bluetooth stack associated with the Bluetooth radio 130-2 may detect this PD ID 168 and, via execution of code instructions of the automatic peripheral device pairing management system pairing agent 156 of the managed information handling system 100, compare it to the PD ID 168 received from the backend management server 170 by the managed information handling system 100. Again, the PD ID 168 stored in the UEFI memory device 160 and accessed by the Bluetooth stack may include a plurality of PD IDs 168. This PD ID 168 is also correlated to a corresponding temporary key 166 for the wireless PD 142 identified as the querying wireless PD 142. When the ITDM has ordered a plurality of wireless PDs 142 for the user to use, the ITDM may deliver the ordered wireless PD 142 to a random user of a managed information handling system 100 among a plurality of managed information handling systems 100 within a group, enterprise, or corporation. Again, this allows the ITDM or operator of the managed information handling system 100 to assign a specific PD 142 to a specific managed information handling system 100, a specific PD 142 to one of a plurality of managed information handling systems 100, a plurality of PDs 142 to a specific managed information handling system 100, or a plurality of PDs 142 to any of a plurality of managed information handling systems 100. This presents a user of the managed information handling system 100 with the freedom to choose specifically or generally which PD 142 can be paired with which managed information handling system 100 according to embodiments herein.

Where the PD ID 168 provided by the wireless PD 142 device does not match the PD ID 168 accessed by the Bluetooth stack of the Bluetooth radio 130-2, the pairing process is not completed. Where the PD ID 168 provided by the wireless PD 142 matches the or one of the PD IDs 168 stored in the UEFI memory device 160, the automatic verification and initiation of BT pairing process may proceed via execution of code instructions of the automatic peripheral device pairing management system pairing agent 156. In an embodiment, the Bluetooth stack of the Bluetooth radio 130-2 may request certain received signal strength indicator (RSSI) data signal from the wireless PD 142. RSSI data signal is received by the BT radio of the managed information handling system 100 and the power level being received from the radio at the wireless PD 142 (e.g., after calculated antenna and cable loss) can be determined. RSSI threshold data received by the wireless interface adapter of the managed information handling system 100 indicates whether, in an embodiment, the wireless PD 142 is within a threshold range of the managed information handling system 100. In an embodiment where multiple wireless PDs 142 had been ordered by a ITDM to be paired with any of a plurality of managed information handling systems 100, the RSSI threshold may prevent other wireless PDs 142 that are not within a threshold distance of the user's managed information handling system 100 from initiating automatic BT pairing. This may occur especially where two employees of an enterprise are to be given wireless PDs 142 to pair with their respective managed information handling systems 100 and they are within close proximity to each other during the pairing process (e.g., cubicle neighbors, desk mates, etc.). The RSSI power level provided by the wireless PD 142 may be compared to a RSSI threshold value set at the Bluetooth radio of the managed information handling system 100. Where the PD 142 RSSI value does not meet or exceed the RSSI threshold value, the managed information handling system 100 may ignore the pairing request of the PD 142. Where the RSSI value meets or exceeds the RSSI threshold value, the Bluetooth stack of the Bluetooth radio within the managed information handling system 100 may continue the automatic verification and initiation of BT pairing process to establish a BT wireless link.

The automatic verification and initiation of the BT pairing process, in an embodiment, is executed by code instructions of the automatic peripheral device pairing management system pairing agent 156 of the managed information handling system 100 and includes the managed information handling system 100 verifying that the TK 166 matches the copy PD temporary key stored at the wireless PD 142 attempting to BT pair with the managed information handling system 100. This may be done with a process where the TK 166 is used with a confirm value generation function or other cipher algorithm to encrypt a generated message or data sent to the wireless PD 142 and the PD temporary key is used to decrypt the message and a message is encrypted and decrypted in the reverse between the wireless PD 142 and the managed information handling system 100 as well. With such encryption and decryption if the messages match, the TK 166 and PD temporary key may be verified as matching in one example embodiment. In an embodiment, the automatic verification and initiation of the BT pairing process may use a Bluetooth out-of-band (OOB), a legacy BLE OOB pairing, a Bluetooth Low Energy (BLE) OOB pairing protocol, or any other suitable protocol to verify and then to BT pair the wireless PD 142 to the managed information handling system 100. In an embodiment, the managed information handling system 100 and wireless PD 142 can each provide various automatic querying, verification, and BT pairing communications that includes the TK 166 verification and a pairing response command via an OOB BT communication.

In an example embodiment, the managed information handling system 100 may calculate and encrypt an Mconfirm value from its copy of the TK 166 via a cipher algorithm such as a confirm value generation function, provide encrypted Mconfirm to the wireless PD, for decryption at the wireless PD 142 its own stored copy of the PD temporary key. Further, the wireless PD 142 may calculate an Sconfirm value with the cipher algorithm such as a confirm value generation function and encrypt it at the wireless PD 142 and send it to the managed information handling system for decryption using TK 166 to determine the sent Sconfirm value. A match of the received Sconfirm from the wireless PD 142 with the Mconfirm from the managed information handling system 100 may be used as verification that the TKs 166 match on each side in such an example embodiment. Where the values match, the BT pairing process establishes a session key and a BT wireless link via the OS BT stack and BT protocols. Then the BT pairing process is completed between the wireless PD 142 and managed information handling system 100. In an embodiment, once the wireless PD 142 is paired with the managed information handling system 100, the TK 166 is no longer used and may be deleted. In an embodiment, the TK 166 may be a single use temporary key in some embodiments with a copy from the wireless PD 142 by the manufacturer and a copy provided to the managed information handling system 100 as described herein.

The systems and methods described herein allows for a secure method of BT pairing a wireless PD 142 such as a wireless mouse 152. The method allows a managed information handling system 100 to receive a TK 166 and PD ID 168 pair that is to be matched with a matching PD temporary key that is a copy of TK 166 and PD ID 168 stored on a wireless PD 142 delivered to a user and used when the wireless PD 142 initiates a pairing request. As such the TK 166 is secured and controlled by the backend management server 170 that has an existing relationship with a managed computing device such as the managed information handling system 100 as well has access to peripheral device manufacturer 176 to receive purchase information described herein. This allows the backend management server 170 to secure the TK 166 at all times while the wireless PD 142 may be securely and automatically BT paired with the managed information handling system 100.

The systems and methods described herein also provide for a backend management server 170 executing a PD assignment agent 180 via a hardware processing resource to assign a wireless PD 142 or a plurality of wireless PDs 142 to a managed information handling system 100 or a plurality of managed information handling systems 100 in a designated subset, group, or even subgroups thereby controlling which device will be given the security data (e.g., PD ID 168 and TK 166) necessary to complete the BT pairing process with one or more wireless PDs 142. The systems and methods described herein further allow for an ITDM to control which user receives which PD 142 as well as securely control the assignment of those wireless PD 142 up until the wireless PDs 142 are paired with their respectively assigned managed information handling systems 100. Where a plurality of PDs 142 have been ordered, the user of the managed information handling system 100 may control how those wireless PDs 142 are distributed among a group of managed information handling systems 100 while still allowing for each wireless PD 142 to be securely and automatically BT paired with their assigned managed information handling system 100. This further allows the user (e.g., an ITDM) to assign a single wireless PD 142 to a single managed information handling system 100, a plurality of wireless PDs 142 to a single managed information handling system 100, any of a plurality of wireless PDs 142 to any of a plurality of managed information handling systems 100, or specific wireless PDs 142 of a plurality of wireless PDs 142 to specific managed information handling systems 100 among all, a group of, or a subset of managed information handling systems 100 as described in various embodiments herein.

In an embodiment, the managed information handling system 100, the backend management server 170, or the ITDM information handling system 178 can include one or more sets of machine-readable code instructions, parameters, and profiles 112 that can be executed to cause the computer system to perform any one or more of the methods or computer-based functions disclosed herein. For example, machine-readable code instructions, parameters, and profiles

112 may execute, via hardware processing resources, various software applications, software agents, the BIOS 114 firmware and/or software, or other aspects or components. Machine-readable code instructions, parameters, and profiles 112 may execute, via the backend management server hardware processor 182 or any other hardware processing device, the PD assignment agent 180 at the backend management server 170 which controls the assigning of wireless PDs 142 to managed information handling systems 100 so that automatic querying, verification, and initiation of BT pairing of wireless PDs 142 with the managed information handling systems 100 can be accomplished in embodiments herein. Still further, machine-readable code instructions, parameters, and profiles 112 may execute, via the hardware processor 102, EC 104, or any other hardware processing device, the automatic PD pairing management system pairing agent 156 at each of the managed information handling systems 100 which manages the pairing of assigned wireless PDs 142 to the managed information handling system 100 via the automatic querying, verification, and initiation of BT pairing of wireless PDs 142 to the managed information handling systems 100 as described herein. Again, the machine-readable code instructions, parameters, and profiles 112 of the PD assignment agent 180 on the backend management server 170 and the automatic PD pairing management system pairing agent 156 on the managed information handling system 100 may be stored on a non-volatile memory device and made accessible to the EC 104, the hardware processor 104, or other hardware processing resource for execution. Various software modules comprising application instructions of machine-readable code instructions, parameters, and profiles 112 may be coordinated by an operating system (OS) 116, and/or via an application programming interface (API). An example OS 116 may include Windows®, Android®, and other OS types known in the art. Example APIs may include Win 32, Core Java API, or Android APIs.

In an embodiment, the disk drive unit 120 and may include machine-readable code instructions, parameters, and profiles 112 in which one or more sets of machine-readable code instructions, parameters, and profiles 112 such as software can be embedded to be executed by the processor 102 or other hardware processing devices such as a GPU 154 to perform the processes described herein. Similarly, main memory 106 and static memory 108 may also contain a computer-readable medium for storage of one or more sets of machine-readable code instructions, parameters, or profiles 112 described herein. The disk drive unit 120 or static memory 108 also contain space for data storage. Further, the machine-readable code instructions, parameters, and profiles 112 may embody one or more of the methods as described herein. In a particular embodiment, the machine-readable code instructions, parameters, and profiles 112 may reside completely, or at least partially, within the main memory 106, the static memory 108, and/or within the disk drive 120 during execution by the hardware processor 102, EC 104, or GPU 154 of managed information handling system 100. The main memory 106, GPU 154, EC 104, and the hardware processor 102 also may include computer-readable media.

Main memory 106 or other memory of the embodiments described herein may contain computer-readable medium (not shown), such as RAM in an example embodiment. An example of main memory 106 includes random access memory (RAM) such as static RAM (SRAM), dynamic RAM (DRAM), non-volatile RAM (NV-RAM), or the like, read only memory (ROM), another type of memory, or a combination thereof. Static memory 108 may contain computer-readable medium (not shown), such as NOR or NAND flash memory in some example embodiments. The applications and associated APIs, for example, may be stored in static memory 108 or on the disk drive unit 120 that may include access to a machine-readable code instructions, parameters, and profiles 112 such as a magnetic disk or flash memory in an example embodiment. While the computer-readable medium is shown to be a single medium, the term "computer-readable medium" includes a single medium or multiple media, such as a centralized or distributed database, and/or associated caches and servers that store one or more sets of machine-readable code instructions. The term "computer-readable medium" shall also include any medium that is capable of storing, encoding, or carrying a set of machine-readable code instructions for execution by a processor or that cause a computer system to perform any one or more of the methods or operations disclosed herein.

In an embodiment, the managed information handling system 100, the backend management server 170, or the ITDM information handling system 178 may further include a power management unit (PMU) 122 (a.k.a. a power supply unit (PSU)). The PMU 122 may include a hardware controller and executable machine-readable code instructions to manage the power provided to the components of the managed information handling system 100 such as the hardware processor 102, and other hardware components described herein. The PMU 122 may control power to one or more components including the one or more drive units 120, the hardware processor 102 (e.g., CPU), the EC 104, the GPU 154, a video/graphic display device 144 or other wired input/output devices 142 such as the stylus 148, a mouse 152, a keyboard 146, and a trackpad 150 and other components that may require power when a power button has been actuated by a user. In an embodiment, the PMU 122 may monitor power levels and be electrically coupled, either wired or wirelessly, to the managed information handling system 100, the backend management server 170, or the ITDM information handling system 178 to provide this power and coupled to bus 118 to provide or receive data or machine-readable code instructions. The PMU 122 may regulate power from a power source such as a battery 124 or AC power adapter 126. In an embodiment, the battery 124 may be charged via the AC power adapter 126 and provide power to the components of the managed information handling system 100, the backend management server 170, or the ITDM information handling system 178 via a wired connections as applicable, or when AC power from the AC power adapter 126 is removed. PMU 122 may include a hardware controller to operate with the EC 104 separately or together to execute machine-readable code instructions, parameters, and profiles 112 of the PD assignment agent 180 at the backend management server 170 and the automatic PD pairing management system pairing agent 156 at the managed information handling system 100 as described herein.

In a particular non-limiting, exemplary embodiment, the computer-readable medium can include a solid-state memory such as a memory card or other package that houses one or more non-volatile read-only memories. Further, the computer-readable medium can be a random-access memory or other volatile re-writable memory. Additionally, the computer-readable medium can include a magneto-optical or optical medium, such as a disk or tapes or other storage device to store information received via carrier wave signals such as a signal communicated over a transmission medium. Furthermore, a computer readable medium can store information received from distributed network resources such as from a cloud-based environment. A digital file attachment to an e-mail or other self-contained information archive or set of archives may be considered a distribution medium that is equivalent to a tangible storage medium. Accordingly, the disclosure is considered to include any one or more of a computer-readable medium or a distribution medium and other equivalents and successor media, in which data or machine-readable code instructions may be stored.

In other embodiments, dedicated hardware implementations such as application specific integrated circuits (ASICs), programmable logic arrays and other hardware devices can be constructed to implement one or more of the methods described herein. Applications that may include the apparatus and systems of various embodiments can broadly include a variety of electronic and computer systems. One or more embodiments described herein may implement functions using two or more specific interconnected hardware modules or devices with related control and data signals that can be communicated between and through the modules, or as portions of an application-specific integrated circuit. Accordingly, the present system encompasses hardware resources executing software or firmware, as well as hardware implementations.

When referred to as a "system," a "device," a "module," a "controller," or the like, the embodiments described herein can be configured as hardware. For example, a portion of an information handling system device may be hardware such as, for example, an integrated circuit (such as an Application Specific Integrated Circuit (ASIC), a Field Programmable Gate Array (FPGA), a structured ASIC, or a device embedded on a larger chip), a card (such as a Peripheral Component Interface (PCI) card, a PCI-express card, a Personal Computer Memory Card International Association (PCMCIA) card, or other such expansion card), or a system (such as a motherboard, a system-on-a-chip (SoC), or a standalone device). The system, device, controller, or module can include hardware processing resources executing software, including firmware embedded at a device, such as an Intel® Core class processor, ARM® brand processors, Qualcomm® Snapdragon processors, or other processors and chipsets, or other such hardware device capable of operating a relevant software environment of the information handling system. The system, device, controller, or module can also include a combination of the foregoing examples of hardware or hardware executing software or firmware. Note that an information handling system can include an integrated circuit or a board-level product having portions thereof that can also be any combination of hardware and hardware executing software. Devices, modules, hardware resources, or hardware controllers that are in communication with one another need not be in continuous communication with each other, unless expressly specified otherwise. In addition, devices, modules, hardware resources, and hardware controllers that are in communication with one another can communicate directly or indirectly through one or more intermediaries.

FIG. 2 is a graphic diagram of a managed information handling system 200 pairable with one or more wireless peripheral devices and operably coupled to, a backend management server 270 and a ITDM information handling system 278 according to an embodiment of the present disclosure. In the embodiment shown in FIG. 2, the peripheral devices include a wireless mouse 252 and a wireless keyboard 246. However, it is appreciated that any type of peripheral device may be wirelessly coupled to the managed information handling system 200 and may include any wireless input/output device shown in FIG. 1 such as a wireless video display device (e.g., external video display device), a wireless stylus, a wireless trackpad, and other similar devices.

The managed information handling system 200 may, in an example embodiment, be a laptop-type managed information handling system 200. The managed information handling system 200 may, in an example embodiment, be a 360°-type managed information handling system 200. In the example shown in FIG. 2, the managed information handling system 200 may be a 360° managed information handling system 200 where an exterior surface of the bottom cover or bottom chassis 274 of a base chassis 276 may be brought towards an exterior side of the back display chassis 279 of the display chassis 280 to place the managed information handling system 200 in a tablet configuration in one embodiment. As shown in FIG. 2, the managed information handling system 200 may also be placed in a laptop configuration where the base chassis 276 is lying flat on a surface with the display chassis 279 being placed upright from the base chassis 276. Other configurations such as a dual tablet configuration and a tent orientation are contemplated as described herein.

As described herein, the managed information handling system 200 may include a plurality of chassis made of metal, plastic, or the like. The managed information handling system 200, in an embodiment, may comprise an outer case or shell of a managed information handling system 200 for housing internal components of the managed information handling system 200, such as a video display device 244 (e.g., a built-in video display device 244), a cursor control device (e.g., built-in trackpad or touchpad 250), and an alpha numeric input device (e.g., built-in keyboard 282). As shown in FIG. 2, the managed information handling system 200 may include a built-in video display device 244 functioning to enclose the display chassis 280 with the back display chassis 279 described herein.

As another example, the managed information handling system 200 may further include the keyboard chassis 284 functioning to enclose a cursor control device such as a trackpad 250 and/or the built-in keyboard 290 acting as an alpha numeric input device. The back display chassis 279 and the video display device 244 may be joined together in an embodiment to form a fully enclosed display chassis 280, while the keyboard chassis 284 and a bottom chassis 274 may be joined together to form a fully enclosed base chassis 276. Taking a closed configuration as a reference position of the video display device 244 including the back display chassis 279 and the base chassis 276 including the keyboard chassis 284 and bottom chassis 274, the video display device 244 and back display chassis 279 may be rotated away from the base chassis 276 into the laptop configuration as shown in FIG. 2.

As described herein, the managed information handling system 200 includes computer readable program code of an automatic peripheral device pairing management system pairing agent 256. When the computer readable program code of the automatic peripheral device pairing management system pairing agent 256 is executed by a hardware processing resource described herein an automatic querying, verification, and initiation of a BT pairing process may be completed according to the systems and methods described herein.

As described herein, the method of an automatic querying, verification, and initiation of a BT pairing process includes receiving, at the managed information handling system 200, temporary key and device identification data 264 from a backend management server 270 by the automatic peripheral device pairing management system pairing agent 256. This process includes the managed information handling system 200 being communicatively coupled to a backend management server 270 that hosts, in an embodiment, a backend management server database 272 used to store temporary keys 266 and PD IDs 268 that are associated with wireless PD 246, 252 assigned to be paired with the managed information handling system 200.

As described herein, in an embodiment, the TKs 266 and PD IDs 268 are stored on the backend management server database 272 and are also assigned, by a hardware processor executing a PD assignment agent 280 of a ITDM information handling system 278, to specific wireless PDs 246, 252. In embodiment, the wireless PD ID 268 is provided to the backend management server 270 by a PD manufacturer (e.g., 176, FIG. 1) of the wireless PD 246, 252 being delivered to the user of the managed information handling system 200. As described herein, the manufacturer may cause the PD ID 268-1, 268-2 (e.g., a copy of the PD ID 268) and peripheral device temporary key 266-1, 266-2 that is a copy of TK 166 to be stored on a memory device as shown (e.g., non-volatile memory device) within the wireless PD 246, 252 prior to shipping of the wireless PD 246, 252 to the user or an enterprise. In an embodiment, the PD ID 268 may be a serial number (e.g., a 12-digit serial number) or a randomly generated number that is unique to the specific wireless PD 246, 252. In an embodiment, the manufacturer also provides the TK 266 along with the PD ID 268 to the backend management server 270. In this example embodiment, the manufacturer executes, with a hardware processing resource, a random number generator, a hash function, a cryptographic hash function, or any other cryptographic key generating algorithm with some key seed data, such as a serial number or other seed data, that creates a unique TK 266 to be associated with the wireless PD 246, 252 and its PD ID 268. In another embodiment, after the backend management server 270 has received the PD ID 268 or some seed data from the manufacturer, a hardware processing resource of the backend management server 270 executes a random number generator, a hash function, a cryptographic hash function, or any other cryptographic key generating algorithm with the key seed data to create a unique TK 266 to be associated with the wireless PD 246, 252 and its PD ID 268. Here, the backend management server 270 may send a copy of the generated TK 266 back to the PD manufacturer so that the PD manufacturer may store the peripheral device temporary key 266-1, 266-2 that is a copy of the TK 266 for that peripheral device on the memory device on the wireless PD 246, 252 as described herein. It is understood that each peripheral device 246 and 252 will have a unique TK 166 stored at the managed information handling system and generated by backend management server 270 in embodiments herein.

Along with the PD ID 268, the manufacturer may provide purchasing data to the backend management server 270 identifying a purchaser who has purchased the wireless PD 246, 252. Again, this data may include a street address of the purchaser, a name of the purchaser, a unique customer number, or any other identification data that allows the backend management server 270 to know who purchased the wireless PD 246, 252 that has the PD ID 268 and TK 266 associated with it. In an embodiment, the backend management server 270 may cross-reference this purchasing data identifying the purchaser with user data maintained by the backend management server database 272 on the backend management server 270. Where an identifying match between the purchaser and the user is determined, the backend management server 270 may be assigned to transmit, securely, the PD ID 268 and TK 266 to the user's managed information handling system 200 or a managed information handling system 200 assigned to the user.

In an embodiment, a single user may purchase the wireless PD 246, 252 from the manufacturer causing a single PD ID 268 and TK 266 set to be uniquely assigned to each of the specific wireless PD 246, 252 ordered by the user. Each wireless PD 246, 252 will have its own PD ID 268 and its own TK 266 provided to the managed information handling system 200. In this embodiment, the backend management server 270 may transfer, securely, the PD ID 268 and TK 266 to that user's managed information handling system 200, for example one unique TK 266 and PD ID 268 for each wireless PD 246, 252 available to be paired. The transmission of the PD ID 268 and TK 266 to the user's managed information handling system 200 may be accomplished by the backend management server 270, executing a PD assignment agent 280 and automatic peripheral device pairing management system 258 that detects the online presence of the user's managed information handling system 200 and initiates a data transfer session. As described herein, the ITDM information handling system 278 may, with a hardware processing resource (e.g., hardware processor 102), access a PD assignment agent 280 executed on the backend management server 270 to assign the wireless PD 246, 252 to a specific managed information handling system 200 by instructing the backend management server 270 to send PD-specific TK 266-1, 266-2 and PD ID 268-1, 268-2 to the managed information handling system 200 or to a plurality of managed information handling systems 200. In an embodiment, this data transfer conducted by the automatic peripheral device pairing management system 258 and PD assignment agent 280 includes the transfer, at least, of the TK 266 and PD ID 268. Other data may also be transferred such as RSSI threshold level data that indicates a required RSSI value that must be detected by the managed information handling system 200 before the wireless PD 246, 252 is allowed to be BT paired with the managed information handling system 200. Concurrently, the manufacturer may ship the wireless PD 246, 252 to the user's address or other address as indicated on the purchasing order associated with the wireless PD 246, 252. Again, the wireless PD 246, 252 shipped by the manufacturer includes a matching PD ID 268-1, 268-2 and peripheral device temporary key 266-1, 266-2 stored on non-volatile memory on the wireless PD 246, 252 that is used to be matched with the unique TK 266 and PD ID 268 stored on the UEFI memory device of the managed information handling system 200 for that wireless PD 246, 252.

In an embodiment, an ITDM of an enterprise or corporation may be assigned to be the purchasing agent for one or more users within that enterprise or corporation. The ITDM may, in an embodiment order a single wireless PD 246, 252 or a plurality of wireless PDs 246, 252. In the example embodiment where the ITDM orders a plurality of wireless PDs 246, 252, the wireless PDs 246, 252 may be assigned to one or more of a plurality of managed information handling systems 200 operated by one or more of the users.

In an embodiment, the PD IDs 268 and TKs 266 associated with specific wireless PDs 246, 252 that have been ordered by the ITDM may be unique to each individual wireless PD 246, 252. In this embodiment, a group of sets of PD IDs 268 and TKs 266 may be sent to each of the managed information handling systems 200 or a subgroup of the managed information handling systems 200 in a designated subset of managed information handling systems.

Here, as the wireless PDs 246, 252 are shipped to the enterprise or corporation, the multiple sets of PD IDs 268 and temporary keys 266 provided to each of the managed information handling systems 200 or a subgroup of the managed information handling systems 200 may be provided to each potential managed information handling system 200 as a temporary key and device identification data 264 package. However, because each wireless PD 246, 252 shipped by the manufacturer includes one set of PD ID 268 and TK 266 that matches any one of the sets of PD IDs 268 and TKs 266 sent to each of the managed information handling systems 200 or a subgroup of the managed information handling systems 200, the wireless PD 246, 252 may be BT paired with any of the managed information handling systems 200 or subgroup of the managed information handling systems 200. Upon pairing however, the TK 266 may be discarded or deleted if it is a one-time use TK 266, thus preventing the wireless PD 246, 252 from automatically pairing with multiple managed information handling systems 200 after it has paired with one. In other embodiments, TK 266 may not be one-time use. As each user powers on a wireless PD 246, 252 sent to them by the ITDM, the managed information handling system 200 may have sufficient PD ID 268 and TK 266 data to pair with any of the wireless PDs 246, 252 in a set of ordered wireless PDs 246, 252. In an embodiment, even where multiple wireless PDs 246, 252 are powered on near a specific managed information handling system 200, RSSI data may be used to selectively BT pair the managed information handling system 200 with the closest wireless PD 246, 252 as described herein.

As described herein, the ITDM may be provided with access to the backend management server 270 via execution of the PD assignment agent 280 by a hardware processor of the ITDM managing information handling system 278, for example. This allows the ITDM to assign a specific wireless PD 246, 252 ordered by the ITDM to a specific managed information handling system 200 or to any of the managed information handling systems 200 within a subgroup or subset of the managed information handling systems 200 within the enterprise or corporation. In this embodiment, because the specific PD ID 268 and TK 266 have been associated with a specific ordered wireless PD 246, 252, only that wireless PD 246, 252 assigned by the ITDM to a specific managed information handling system 200 or subgroup of the same may be paired with that managed information handling system 200 or subgroup. Even where multiple wireless PD 246, 252 (e.g., those wireless PDs 246, 252 ordered by the ITDM) are turned on near any given managed information handling system 200, the PD ID 268 and TK 266 sent to the specific managed information handling system 200 or subgroup of managed information handling systems 200 causes the managed information handling system 200 or any single system within the subgroup to be paired to only one wireless PD 246, 252 that also includes, on its non-volatile memory device, the matching PD ID 268 and/or TK 266 as described herein.

In an embodiment, the TK 266 may be a single-use temporary key in some embodiments with a copy from the wireless PD 246, 252 by the PD manufacturer and a copy provided to the managed information handling system 200. Because the TK 266 is a single-use temporary key, it is not used again after the pairing of the PD to the managed information handling system 200 providing more security to the automatic querying, verification, and initiation of BT pairing process. In an embodiment, where the TK 266 is deleted, a newly, agreed-upon session key is used for the managed information handling system to provide to the wireless PD 246, 252 during any subsequent BT pairing with the wireless PD 246, 252. This allows an ITDM to order specific types of wireless PDs 246, 252 (e.g., a left handed mouse, a right handed mouse, an external keyboard that includes a ten-key input system, an external monitor that has sufficient resolution to be wirelessly paired with an information handling system, etc.) and assign those specific types of wireless PDs 246, 252 to not only specific managed information handling systems 200 but to specific users who are intended to operate those managed information handling systems 200 and the paired wireless PD 246, 252.

In an embodiment, the individual managed information handling systems 200 may request any potential PD ID 268 and TK 266 periodically. For example, a correlating software agent (e.g., Dell® SupportAssist® operating on the managed information handling system 200) of the managed information handling system 200 executed by a hardware processor may periodically send requests to the backend management server 270 for any potential PD ID 268 and TK 266 now assigned by the backend management server 270/ ITDM to the user's managed information handling system 200. In an embodiment, those managed information handling systems 200 identified by the backend management server 270 as being associated with a specific user may be described as a managed device that uses the software agent (e.g., Dell® SupportAssist®) to receive updates, software packages and the temporary key and device identification data 264 as described herein. Additionally, or alternatively, computer readable program code executed by a hardware processor on the backend management server 270 may detect that the managed information handling system 200 is online and push the PD ID 268 and TK 266 to the managed information handling system 200, again, with the execution of the automatic PD pairing management system 258 by a hardware processor on the backend management server 270. As such the managed information handling system 200 may be operatively coupled to the backend management server 270 via the network using a wireless connection, a wired connection, or a combination of wired and wireless connections so that the PD ID 268 and TK 266 may be sent to and received at the managed information handling system 200 securely.

In an embodiment, as each of the managed information handling systems 200 receives the temporary key and device identification data 264 (e.g., TK 266 and PD ID 268) the PD ID 268 and TK 266 may be stored in the UEFI memory device 260 as UEFI variable data 262. Again, in an embodiment, the UEFI memory device 260 may be any memory device that maintains the PD ID 268 and TK 266 for later retrieval by a Bluetooth stack under direction of a hardware processor (e.g., embedded controller, hardware CPU, hardware GPU, etc.). In an embodiment, the Bluetooth stack includes computer executable program code with hardware that, when executed by a hardware processor (e.g., hardware processor 102, embedded controller 104, CPU, GPU 154 of FIG. 1, or any other hardware processing resource) along with execution of the automatic peripheral device pairing management system pairing agent 256, performs automatic querying, verification, and BT pairing initiating operations between the managed information handling system 200 and wireless PD 246, 252. The OS BT stack also accesses the UEFI variable data 262 for future pairing processes, and controls operations of a Bluetooth radio, among other functions. A plurality of protocols may be present in the Bluetooth stack which may include core protocols (e.g., computer executable program code executed by a hardware processing resource) including Bluetooth radio, baseband, link manage protocol, logical link control and adaptation protocol, and service discovery protocols. Still further, the protocols present with the Bluetooth stack include adopted protocols such as those protocols adopted from standard models (e.g., Point-to-Point Protocol, Internet Protocol, User Datagram Protocol, Transmission Control Protocol, and Wireless Application Protocol). Attention command sets may also be part of the protocols associated with the Bluetooth stack. Physical layers of the Bluetooth stack also include a radio (e.g., Bluetooth radio 130-2, FIG. 1) housed within the managed information handling system 200 used to transmit radio waves at a specific frequency as described herein.

The frequency with which the Bluetooth stack of the Bluetooth radio queries the UEFI variable data 262 to determine if temporary key and device identification data 264 is available may vary. In an embodiment, the Bluetooth stack may query the UEFI memory device 260 for the UEFI variable data 262 during every power up of the managed information handling system 200. In an embodiment, the Bluetooth stack may query the UEFI variable data 262 on the UEFI memory device 260 a plurality of times when the managed information handling system 200 is powered up.

As the backend management server 270 receives the temporary key and device identification data 264 from the manufacturer of the wireless PD 246, 252, the manufacturer of the wireless PD 246, 252 may ship the wireless PD 246, 252 to the user (e.g., ITDM or user of the managed information handling system 200). The shipping of the wireless PD 246, 252 to the end user (e.g., a single user or an ITDM and enterprise or corporation) may happen while the backend management server 270 correlates the PD ID 268 and a generated TK 266 with the user's identity (or ITDM and enterprise's or corporation's identity) and the managed information handling system 200 operated by the user. Thus, in an embodiment, the temporary key and device identification data 264 may be relayed to the managed information handling system 200 prior to the user receiving, via shipment, the wireless PD 246, 252. This allows the automatic peripheral device pairing management system pairing agent 256 to, with the Bluetooth stack, retrieve the TK 266 and PD ID 268 in preparation for pairing the wireless PD 246, 252 that queries the managed information handling system 200 for automatic verification and pairing.

As the user receives the wireless PD 246, 252 from the manufacturer, the user may power up the wireless PD 246, 252. In the example of the wireless mouse 252 or the wireless keyboard 246 shown in FIG. 2, this may include moving a power switch on the wireless PD 246, 252 to an on position. The powering on of the wireless PD 246, 252 causes the wireless PD 246, 252 to broadcast a pairing query signal that includes a pairing request on an OOB BT broadcast communication channel. In the embodiments herein, this broadcast the pairing query signal from the wireless PD 246, 252 includes the PD ID 268 stored in the non-volatile memory device by the PD manufacturer as described herein. As described herein, the PD ID 268 was stored on the non-volatile memory device on the wireless PD 246, 252 by the PD manufacturer in preparation for this querying, verification, and BT pairing process.

The Bluetooth stack associated with the Bluetooth radio of the managed information handling system 200 and execution of code instructions of the automatic peripheral device pairing management system pairing agent 256 may detect this PD ID 268 from the wireless PD 246, 252 and compare it to the PD ID 268 received from the backend management server 270. Again, the PD ID 268 stored in the UEFI memory device 260 of the managed information handling system 200 and accessed by the Bluetooth stack may include a plurality of PD IDs 268 and temporary keys 266 in those embodiments where the ITDM has ordered a plurality of wireless PDs 246, 252 for any given user to use and passes one of the plurality of ordered PDs to the user of a managed information handling system 200 to make it available to automatically pair with any of several wireless PDs 246, 252. Where a single wireless PD 246, 252 has been ordered by the user, the UEFI memory device 260 of the user's managed information handling system 200 may store a single PD ID 268 (and TK 266).

Where the PD ID 268 provided by the wireless PD 246, 252 device does not match the PD ID 268 accessed by the Bluetooth stack of the Bluetooth radio at the UEFI memory device 260, the pairing process is prevented from continuing. Where the PD ID 268 provided by the wireless PD 246, 252 matches the PD ID 268 or at least one of the PD IDs 268 stored in the UEFI memory device 260, the automatic verification and initiation of the BT pairing process may proceed.

In an embodiment, the Bluetooth stack of the Bluetooth radio may request certain received signal strength indicator (RSSI) value data from the wireless PD 246, 252. RSSI data transmitted includes the power level being received by the receiving radio at the wireless PD 246, 252 (e.g., after calculated antenna and cable loss). This RSSI signal data received by the wireless interface adapter indicates whether, in an embodiment, the wireless PD 246, 252 is within a threshold range of the managed information handling system 200 based on meeting an RSSI threshold. In the embodiment where multiple wireless PDs 246, 252 had been ordered by a ITDM to be paired with any of a plurality of managed information handling systems 200, the RSSI threshold data may prevent other wireless PDs 246, 252 that are not within a threshold distance of the user's managed information handling system 200 from being paired with the managed information handling system 200. Additionally, or alternatively, where multiple wireless PDs 246, 252 had been ordered by a ITDM to be paired with any of a plurality of managed information handling systems 200, the RSSI threshold data may prevent multiple wireless PDs 246, 252 from being paired with a managed information handling system 200 by detecting the wireless PDs 246, 252 with the highest RSSI value and pairing with that wireless PD 246, 252 instead of those wireless PDs 246, 252 that have lower RSSI values. Such as situation may occur especially where two employees of an enterprise are to be given wireless PDs 246, 252 to pair with their respective managed information handling systems 200 and they are within close proximity to each other during the pairing process (e.g., cubicle neighbors, desk mates, etc.) of their received wireless PDs 246, 252. In an embodiment, the RSSI value provided by the wireless PD 246, 252 may be compared to a RSSI threshold value set at the Bluetooth radio as well. In some embodiments, limitation of pairing with wireless PDs 246, 252 may be limited by type of wireless PD. For example, only one wireless keyboard 246 may be automatically paired with an RSSI meeting a threshold while one wireless mouse 252 with a threshold meeting RSSI may also be paired in embodiments herein. Where the detected wireless PD RSSI value does not meet or exceed the RSSI threshold value, the managed information handling system 200 may ignore the pairing request of the wireless PD 246, 252. Where the RSSI value meets or exceeds the RSSI threshold value, the Bluetooth stack of the Bluetooth radio and the automatic peripheral device pairing management system pairing agent 256 may continue the automatic verification and initiation of the BT pairing process with only that wireless PD 246, 252 that has the highest RSSI value. This prevents multiple wireless PDs 246, 252, for example of the same type, from incorrectly being paired with any single managed information handling system 200.

The automatic verification and initiation of the BT pairing process, in an embodiment, is executed by code instructions of the automatic peripheral device pairing management system pairing agent 256 and includes the managed information handling system 200 comparing the temporary key 266 to the copy PD temporary key stored at the wireless PD 246, 252 attempting to BT pair. In an embodiment, the automatic verification and initiation of the BT pairing process may use a Bluetooth out-of-band (OOB), a legacy Bluetooth Low Energy (BLE) OOB pairing, a Bluetooth Low Energy (BLE) OOB Pairing protocol, or any other suitable protocol to verify and then to BT pair the wireless PD 246, 252 to the managed information handling system 200. In an embodiment, the managed information handling system 200 and wireless PD 246, 252 can each provide various automatic querying, verification, and BT pairing communications that includes the TK 266 and a pairing response command via an OOB BT communication. In an embodiment, the managed information handling system 200 may determine an Mconfirm value encrypted message from its copy of the temporary key via an encryption algorithm (e.g., a 128-bit random number Mrand, the temporary key, and other pairing data), and send the encrypted Mconfirm to the wireless PD 246, 252, and receive a calculated encrypted Sconfirm (e.g., a 128-bit random number Srand encrypted with its copy PT temporary key, and other pairing data) from the wireless PD 246, 252 that calculated a PD Sconfirm value from its own stored copy of the PD temporary key and the received Mconfirm value decrypted. A match the received Sconfirm from the wireless PD 246, 252 as well as the calculated Mconfirm in the managed information handling system 200 may be used as verification. Where the values match (e.g., the Mrand and Srand passed between the wireless PD 246, 252 and the managed information handling system 200 indicate the temporary keys 266 and the PD temporary key match), the BT pairing process establishes a session key and a BT wireless link via the OS BT stack and BT protocols. Then the BT pairing process is completed between the wireless PD 246, 252 and managed information handling system 200. In an embodiment, once the wireless PD 246, 252 is paired with the managed information handling system 200, the temporary key is no longer used and may be deleted. In an embodiment, the temporary key may be a single use temporary key in some embodiments with a copy from the wireless PD 246, 252 by the manufacturer and a copy provided to the managed information handling system 200.

The systems and methods described herein allows for a secure method of BT pairing a wireless PD 142 such as a wireless mouse 152. The method allows a managed information handling system 100 to receive a TK 166 and PD ID 168 pair that is to be matched with a matching copy PD TK 166 and PD ID 168 stored on a wireless PD 142 delivered to a user and used when the wireless PD 142 initiates a pairing request. As such, the TK 166 is secured and controlled by the backend management server 170 that has an existing relationship with a managed computing device such as the managed information handling system 100 as well as access to peripheral device purchase information described herein. This allows the backend management server 170 to secure the TK 166 at all times while the wireless PD 142 is being BT paired with the managed information handling system 100.

The systems and methods described herein also provide for a backend management server 270, and ITDM managing information handling system 278, or some combination executing a PD assignment agent 280 via a hardware processing resource to assign a wireless PD 246, 252 or a plurality of wireless PDs 246, 252 to a managed information handling system 200 or a plurality of managed information handling systems 200 thereby controlling which device will be given the security data (e.g., PD ID 268 and TK 266) necessary to complete the BT pairing process. The systems and methods described herein further allow for an ITDM to control which user receives which wireless PD 246, 252 as well as securely control the assignment of those wireless PD 246, 252 up until the wireless PD 246, 252 are paired with their respectively assigned managed information handling systems 200. Where a plurality of wireless PDs 246, 252 have been ordered, the user of the managed information handling system 100 may control how those wireless PD 246, 252 are distributed among or within a group of managed information handling systems 200 in any selectable combination of subgroups or individual systems while still allowing for each wireless PD 246, 252 to be securely and automatically BT paired with their assigned managed information handling system 200. This further allows the user (e.g., an ITDM) to assign a single wireless PD 246, 252 to a single managed information handling system 200, a plurality of wireless PDs 246, 252 to a single managed information handling system 200, any of a plurality of wireless PDs 246, 252 to any of a plurality of managed information handling systems 200, or specific wireless PDs 246, 252 of a plurality of wireless PDs 246, 252 to specific managed information handling systems 200 among all, a group of, or a subset of managed information handling systems 200.

Figure 3:
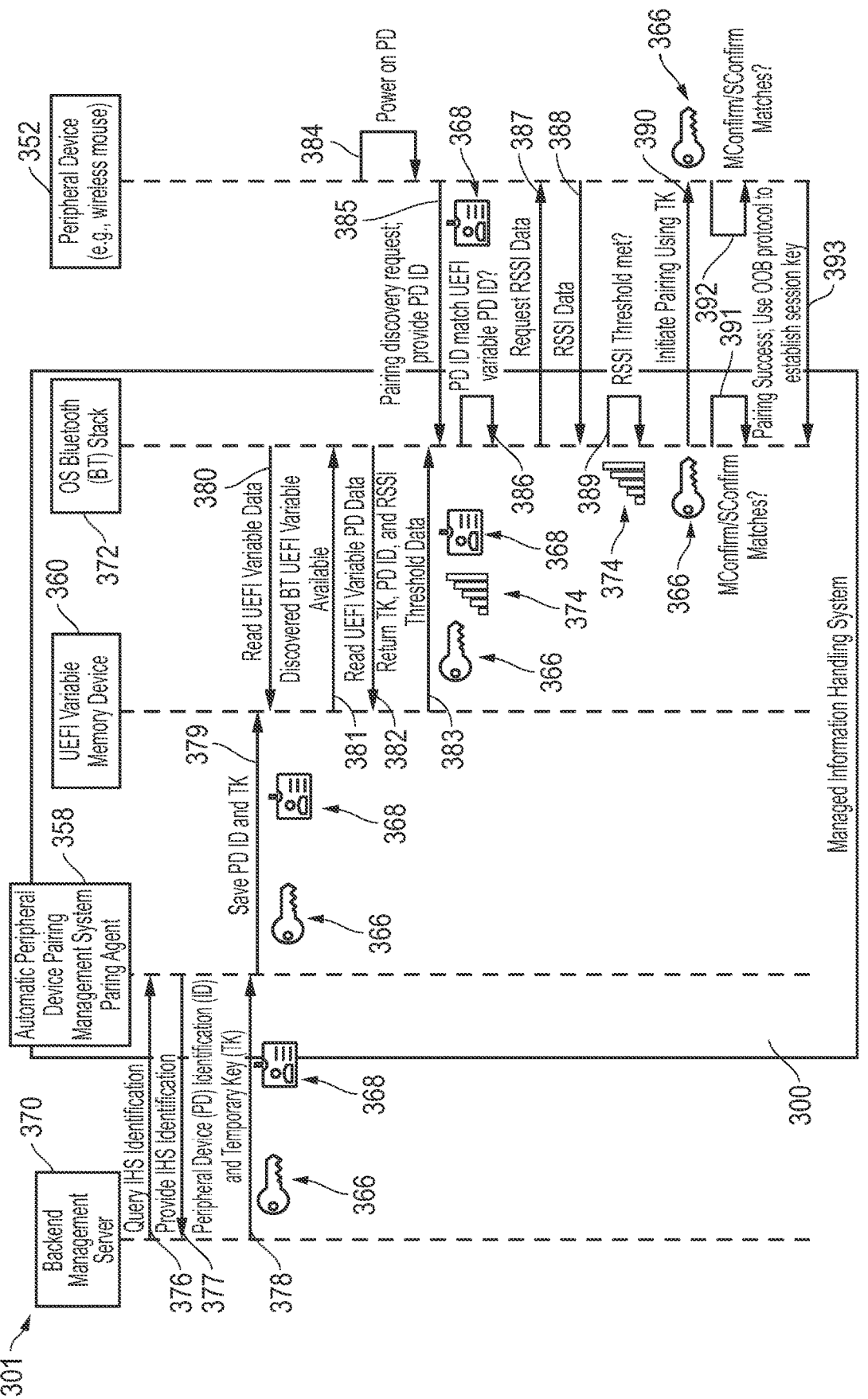
FIG. 3 is a process flow diagram of a method of automatically querying, verifying, and Bluetooth® pairing a wireless peripheral device to a managed information handling system using assignment inputs from a managing information handling system according to an embodiment of the present disclosure.

FIG. 3 is a process flow diagram of a method 301 of operatively pairing a BT wireless peripheral device 352 to a managed information handling system 300 according to an embodiment of the present disclosure. In the context of the FIG. 3, the wireless peripheral device 352, in one example, may be referred to as a wireless mouse although the present specification contemplates that any wireless peripheral device 352 may be used in the method 301 described herein. FIG. 3 shows a backend management server 370, a managed information handling system 300, and a wireless peripheral device 352 where execution of code instructions of an automatic peripheral device pairing management system pairing agent 358 at the managed information handling system 300 and its operating system (OS) BT stack 372 at the managed information handling system 300 coordinate to manage queries, automatic verification and pairing of the wireless peripheral device 352 to the managed information handling system 300 managed by the backend management server 370.

The method 301 includes a backend management server database (not shown) of the backend management server 370 that maintains one or more sets of PD IDs 368 and TKs 366 for wireless peripheral devices ordered by an enterprise or customers of a management system. Each PD ID 368 and TK 366 set may correspond with an individual and specific peripheral device 352 such as a wireless mouse and may be received from the manufacturer. In some embodiments, the TK 366 is generated at the backend management server 370. The PD ID 368 and TK 366 are assigned to a specific wireless peripheral device 352 because the backend management server 370, via execution of computer readable program code of a software system (e.g., Dell® SupportAssist®) including an automatic PD pairing management system of embodiments herein by a hardware processor, has determined that the ordered wireless peripheral device 352 was ordered by a user of the managed information handling system 300. As described herein, the manufacturer of the wireless peripheral device 352 may forward, at least, the PD ID 368 associated with the wireless peripheral device 352 to the backend management server 370. In an embodiment, the PD ID 368 may be a serial number or other identification data assigned by the PD manufacturer to the specific wireless peripheral device 352 during the manufacturing process. The TK 366 may be any key that is created by one of the backend management server 370 or the PD manufacturer as described herein. Where the PD manufacturer creates the TK 366, it too may be forwarded onto the backend management server 370 along with the PD ID 368 assigned to the specific wireless peripheral device 352. Where the backend management server 370 creates the TK 366, the backend management server 370 associates the TK 366 with the PD ID 368 on the backend management server database and forwards the TK 366 to the PD manufacturer for association with the PD ID 368 for the ordered wireless peripheral device 352. At this point, the PD manufacturer uploads the PD ID 368 and TK 366 specific to that wireless peripheral device 352 to a non-volatile memory device on the wireless peripheral device 352 for shipment to the user of the managed information handling system 300. In one embodiment, the manufacturer or backend management server 370 executes, with a hardware processing resource, a random number generator, a hash function, a cryptographic hash function, or any other cryptographic key generating algorithm that creates a unique TK 266 to be associated with the wireless PD 352 and its PD ID 368. In an embodiment, the PD ID 368 may be used as seed data used with or without the executed random number generator, in a hash function, a cryptographic hash function, or any other cryptographic key generating algorithm to generate the TK 366. This allows the generated TK 366 to be unique to the wireless peripheral device 352 it is assigned to and placed on the non-volatile memory device of the wireless peripheral device 352. Further the TK 366 may be a single use key in some embodiments with a copy from the wireless PD 352 by the manufacturer and a copy provided to the managed information handling system 300. As described in embodiments herein and further discussed in FIG. 4 below, the backend management server may also receive assignment instructions from a PD assignment agent operated at the backend management server 370, an ITDM managing information handling system (not shown), or some combination. With the PD assignment agent, an ITDM may submit assignment instructions for ordered wireless peripheral devices 352 to a designated subset of managed information handling systems 300 for specific managed information handling systems 300 or in varying selectable subgroups via GUI for automatic querying, verification and BT pairing according to embodiments herein.

As described herein, the backend management server 370 may manage one or more managed information handling systems 300. For example, the backend management server 370 may execute a software agent (e.g., Dell® SupportAssist®) that operatively couples the backend management server 370 with the managed information handling system 300 to treat the managed information handling system 300 as a managed information handling system 300. With this management of the managed information handling system 300, the backend management server 370 may establish a communication with the information handling system (IHS) 300 by querying the managed information handling system 300 based on the identification of the managed information handling system 300 at 376. In an embodiment, the managed information handling system 300 may also include a software agent (e.g., Dell® SupportAssist®) that allows the managed information handling system 300 to communicate with the backend management server 370 whenever the managed information handling system 300 has established a wired or wireless connection with the backend management server 370. When the managed information handling system 300 establishes this connection with the backend management server 370, the query at line 376 is responded to by the managed information handling system 300 at line 377 with the identification of the managed information handling system 300, for example, a serial number of the managed information handling system 300. In an embodiment, the backend management server 370, upon receiving the identification data of the managed information handling system 300, may cross-reference this identification data with a user identification on the backend management server database. This user identification and managed information handling system 300 identification data may establish management communications with the managed information handling system. The backend management server 370 may execute code instruction, with a hardware processor of an automatic peripheral device pairing management system and use the managed information handling system 300 identification data received to determine if the user had recently purchased the wireless peripheral device 352. As described herein, the manufacturer of the wireless peripheral device 352 may provide purchasing data to the backend management server 370 describing the purchaser of the wireless peripheral device 352 as well as identification of the purchased wireless PD 352. For example, where John Smith has purchased a wireless mouse on a third-party website or directly from the manufacturer, the manufacturer may forward the PD ID 368, the purchaser's name, enterprise name, or other identification, purchasing data such as time of purchase information, a street address, and the like to the backend management server 370. This identification data may be used by the backend management server 370 to determine if the user of the information handling system is a user of a managed information handling system 300 being managed by the backend management server 370. Where the identification data of the managed information handling system 300 matches the user's data and the purchasing data matches the user's data, the backend management server 370, at line 378, provides the PD ID 368 and TK 366 associated with the purchased wireless peripheral device 352 to the automatic peripheral device pairing management system pairing agent 358 at the managed information handling system 300. The delivery of the PD ID 368 and TK 366 of the temporary key and device identification data is conducted using a secure link between the backend management server 370 and the managed information handling system 300 to prevent this data from being stolen by an intermediary third party. This secure link may include a tunneling protocol that includes encryption of data packets (e.g., that includes secure application layers, secure transport layers, and the like) to prevent use of the TK 366 and/or PD ID 368 by an intermediary third party.

In an embodiment, the automatic peripheral device pairing management system pairing agent 356 described herein receives the PD ID 368 and TK 366. As described herein, the automatic peripheral device pairing management system pairing agent 356 may be computer readable program code executable by a hardware processing resource that controls the transmission and storage of the PD ID 368 and TK 366 at the managed information handling system 300. At line 379, the automatic peripheral device pairing management system pairing agent 356 provides instructions to a hardware processing resource (e.g., hardware processor, embedded controller, GPU CPU, etc.) to store the temporary key and device identification data that includes the PD ID 368 and TK 366 in a UEFI memory device 360 in an embodiment. The UEFI memory device 360 may be any memory device that maintains the PD ID 368 and TK 366 for later retrieval by an operating system (OS) Bluetooth (BT) stack 372 under direction of a hardware processor executing code instructions of the automatic peripheral device pairing management system pairing agent 356 to conduct discovery, configuration, and initiation of a BT pairing process with the wireless PD 352. The UEFI memory device 360 may be accessible to the BIOS and/or OS of the managed information handling system 300 and maintained securely in order to prevent the PD ID 368 and TK 366 from being used by other managed information handling systems to pair with the wireless peripheral device 352.

The OS BT stack 372 includes computer executable program code with hardware that, when executed by a hardware processor (e.g., a hardware processor, an embedded controller, or any other hardware processing resource) an under control of the automatic peripheral device pairing management system pairing agent 356, accesses the UEFI variable data on the UEFI memory device 360 for future automatic pairing process discovery, confirmation, and initiation between the managed information handling system 300 and the wireless peripheral device 352. Upon discovery and confirmation of the wireless PD 352, the OS BT stack 372 may perform pairing operations between the managed information handling system 300 and the wireless peripheral device 352 with a session key, and controls operations of a Bluetooth radio (not shown) in order to conduct that pairing operation, among other functions to establish a secure BT wireless link. A plurality of protocols may be present in the OS BT stack 372 which may include core protocols including Bluetooth radio, baseband, link manage protocol, logical link control and adaptation protocol, and service discovery protocols. Still further, the protocols present with the OS BT stack 372 include adopted protocols such as those protocols adopted from standard models (e.g., Point-to-Point Protocol, Internet Protocol, User Datagram Protocol, Transmission Control Protocol, and Wireless Application Protocol). Attention command sets may also be part of the protocols associated with the OS BT stack 372. Physical layers of the OS BT stack 372 also include a radio (e.g., Bluetooth radio 130-2, FIG. 1) used to transmit radio waves at a specific frequency as described herein for establishing the BT wireless link for operation of the wireless PD 352 with the managed information handling system 300 upon pairing.

The OS BT stack 372 of the Bluetooth radio queries the UEFI variable data stored on the UEFI memory device 360 on the managed information handling system 300 to determine if TK 366 and PD ID 368 is available as directed via the automatic peripheral device pairing management system pairing agent 356. In an embodiment, the OS BT stack 372 may query the UEFI memory device 360 for the UEFI variable data during every power up of the managed information handling system 300. In an embodiment, the OS BT stack 372 may query the UEFI variable data on the UEFI memory device 360 a plurality of times when the managed information handling system 300 is powered up in some embodiments.

Therefore, at line 380, the OS BT stack 372 reads the UEFI variable data from the UEFI memory device 360. This is done so as to discover whether temporary key and device identification data that includes, at least, the TK 366 and PD ID 368 has been stored on the UEFI memory device 360. At line 381, a notice from a hardware processing device operating the UEFI memory device 360 may indicate that a TK 366 and PD ID 368 set has been stored on the UEFI memory device 360. It is appreciated, however, that where no temporary key and device identification data has been stored on the UEFI memory device 360, the hardware processor may similarly indicate that it does not exist to the OS BT stack 372, and the OS BT stack 372 may be required to induct BT pairing under regular, manual BT pairing processes. However, as described in lines 378 and 379, in this example embodiment, the UEFI memory device 360 has received the temporary key and device identification data (e.g., the TK 366 and PD ID 368 associated with the wireless peripheral device 352).

When the OS BT stack 372 has been notified that the temporary key and device identification data is present on the UEFI memory device 360, the OS BT stack 372 may then request that temporary key and device identification data including the TK 366 and PD ID 368 form the UEFI memory device 360 at line 382. In an embodiment, along with the TK 366 and PD ID 368, the UEFI memory device 360 may store RSSI threshold data 374. RSSI data includes data describing the signal power level threshold at which a wireless BT signal is being received by the receiving BT radio from the wireless PD 352 (e.g., after calculated antenna and cable loss) is sufficient to select that wireless PD 352 for discovery, confirmation, and initiation of the automatic BT pairing. The RSSI threshold data 374 received by from the UEFI memory device 360 indicates whether, in an embodiment, a wireless PD 352 that is broadcasting for discovery is within a threshold range of the managed information handling system 300. In the embodiment where multiple peripheral devices 352 had been ordered by a ITDM to be paired with any of a plurality of managed information handling systems 300, the RSSI threshold data 374 may prevent other peripheral devices 352 that are not within a threshold distance of the user's managed information handling system 300 from being paired with the managed information handling system 300 used by the user. Additionally, or alternatively, where multiple peripheral devices 352 had been ordered by a ITDM to be paired with any of a plurality of managed information handling systems 300, the RSSI threshold data 374 may prevent multiple peripheral devices 352 from being paired with a managed information handling system 300 by detecting the wireless peripheral device 352 with the highest detected RSSI value and discovery, confirming, and initiating pairing with that wireless peripheral device 352 instead of those peripheral devices 352 that have lower detected RSSI values. Such as situation may occur especially where two employees of an enterprise are to be given peripheral devices 352 to pair with their respective managed information handling systems 300 and they are within close proximity to each other during the discovery, confirming, and initiating pairing process (e.g., cubicle neighbors, desk mates, etc.) of their received peripheral devices 352. In an embodiment, the RSSI value provided by the wireless peripheral device 352 may be compared to the RSSI threshold data 374 set at the UEFI memory device 360 and monitored by the Bluetooth radio as well. Where the detected wireless peripheral device 352 RSSI value does not meet or exceed the RSSI threshold value of the RSSI threshold data 374, the managed information handling system 300 may ignore the pairing discovery request, BT pairing broadcast discovery signal, and any other pairing data of the wireless peripheral device 352. Where the detected RSSI value of the detected wireless peripheral device 352 meets or exceeds the RSSI threshold value of the RSSI threshold data 374, the OS BT stack 372 of the Bluetooth radio may begin the discovery, confirmation, and initiation of the BT pairing process with only that wireless peripheral device 352 that has the highest RSSI value and the OS BT stack 372 and execution of code instructions of the automatic peripheral device pairing management system pairing agent 356. This prevents multiple peripheral devices 352 from redundantly being paired with any single managed information handling system 300 as well as preventing those peripheral devices 352 that were not intended to be paired with the managed information handling system 300 from initiating pairing.

At line 384, the user may activate or otherwise turn on the wireless peripheral device 352. This process may be conducted while or after the TK 366, PD ID 368, and RSSI threshold data 374 has been received by the OS BT stack 372 from the UEFI memory device 360. Once activated, the wireless peripheral device 352 may broadcast a pairing discovery request on a broadcast BT discovery channel. The pairing discovery request includes the PD ID 368 at line 385. The broadcasting of the PD ID 368 for pairing with the managed information handling system 300 may be conducted via a Bluetooth radio (not shown) and BT stack (not shown) of the wireless peripheral device 352 in an OOB BT communication on an OOB BT broadcast channel as instructed by a hardware processing resource (not shown) on the wireless peripheral device 352. In an embodiment, a hardware controller (not shown) on the wireless peripheral device 352 controls the execution of computer readable program code used to initiate the Bluetooth radio and broadcast pairing discovery requests with a PD ID 368 at 385 on the OOB BT broadcast channel to initiate and conduct the pairing process described herein. Concurrently, the OS BT stack 372 along with a Bluetooth radio may monitor for this broadcasting at line 385 for the managed information handling system 300.

Pursuant to execution of code instructions of the automatic peripheral device pairing management system pairing agent 356, at line 386, the OS BT stack 372 may engage in verifying whether the PD ID 368 received from the broadcast by the wireless peripheral device 352 matches the PD ID 368 received from the backend management server 370, stored on the UEFI memory device 360, and accessed by the OS BT stack 372 of the managed information handling system 300. Where the PD ID 368 from the broadcast of the wireless peripheral device 352 does not match the PD ID 368 accessed by the OS BT stack 372, the pairing request from the wireless peripheral device 352 is ignored, prevented, or otherwise disregarded unless other pairing processes are initiated. In an embodiment, the non-matching of the PD ID 368 from the broadcast of the wireless peripheral device 352 and the PD ID 368 accessed by the OS BT stack 372 may indicate that that particular wireless peripheral device 352 has not been assigned to that particular managed information handling system 300 or that the particular peripheral device is unknown to the backend management server 370 and did not receive temporary key and device identification data related to the peripheral device. In another example embodiment, the ITDM may have accessed the backend management server 370 via the software agent (e.g., Dell® SupportAssist®) and assigned specific peripheral devices 352 to specific managed information handling systems 300 within an enterprise or corporation and the currently broadcasting wireless peripheral device 352 with the unmatched PD ID 368 had not been assigned to the managed information handling system 300 shown in FIG. 3. In some embodiments, the wireless PD 352 may still be manually paired via the OS BT stack 372 using regular BT pairing protocols. It is also appreciated that multiple sets of TKs 366 and PD IDs 368 may have been saved in the UEFI memory device 360 and accessed by the OS BT stack 372 in an embodiment. Here, the mismatch of the broadcasted PD ID 368 from the wireless peripheral device 352 may indicate that the wireless peripheral device 352 was not assigned to the particular managed information handling system 300. Thus, the user may be prompted to try another peripheral device. Potentially, the wireless PD 352 was not assigned to any particular managed information handling system 300 within the enterprise or corporation and may not be pairable or may require manual pairing in various embodiments.

Where, at line 386, the PD ID 368 broadcasted by the wireless peripheral device 352 matches the PD ID 368 accessed by the OS BT stack 372, the automatic verification and initiation of the BT pairing process may continue with the OS BT stack 372 requesting RSSI test transmission data from the wireless peripheral device 352 at line 387. Again, detecting the RSSI levels may determine whether the wireless peripheral device 352 is close enough to be paired with the managed information handling system 300. At line 388, the wireless peripheral device 352 may broadcast, wirelessly, and the BT radio at the managed information handling system 300 determines the RSSI level that describes the power level being received by the receiving BT radio of managed information handling system 300 from the wireless PD (e.g., after calculated antenna and cable loss). In those examples where an ITDM has ordered a plurality of peripheral devices 352 to be wirelessly paired with any of a plurality of managed information handling systems 300 within the enterprise or corporation, the RSSI data transmission levels provided from the wireless peripheral device 352 may prevent simultaneous pairing of multiple peripheral devices 352 used that only meet the RSSI threshold level 374 with the managed information handling system 300 shown in FIG. 3 based on wireless range.

At line 389, the OS BT stack 372, under direction of a hardware processing device, may compare the RSSI levels received from the wireless peripheral device 352 to the RSSI threshold data 374 received from the UEFI memory device 360. Where the RSSI level received from the wireless peripheral device 352 meets or exceeds the RSSI threshold data 374, the automatic verification and initiation of the BT pairing process continues with the automatic peripheral device pairing management system pairing agent 356 instructing the OS BT stack 372 of the managed information handling system 300 and the wireless peripheral device 352 to compare TKs 366 used to establish the regular BT communication channel used to securely pair the wireless peripheral device 352 to the managed information handling system 300. If the TKs 366 match at 391 and 392 as determined at the managed information handling system 300 and wireless PD 352, the verification of pairing success is confirmed at 393. In an embodiment, the managed information handling system 300 and wireless peripheral device 352 may, at lines 391 and 392, calculate and encrypt an Mconfirm value with TK 366 using a cipher algorithm such as a confirm value generation function, provide the encrypted Mconfirm value to the other device which decrypts is using the copy PD TK 366. Then the receiving device calculates and encrypts the value as an Sconfirm with the cipher algorithm such as a confirm value generation function and that is sent and received as an encrypted Sconfirm at the first devices. Upon decryption this received Sconfirm should match the Mconfirm sent. Where the values match (e.g., Mconfirm=Sconfirm), the pairing process is completed between the wireless peripheral device 352 and managed information handling system 300 at line 393. In an embodiment, once the wireless peripheral device 352 is paired with the managed information handling system 300, the TK 366 is no longer used. With this TK 366 verification at the managed information handling system 300 and wireless PD 352, the OS BT stack 372 may conduct BT pairing with a session key pursuant to BT pairing standards.

Again, in an embodiment, the pairing process may use a Bluetooth OOB pairing protocol, a legacy BLE OOB pairing protocol, a BLE OOB Pairing protocol, or any other suitable protocol to pair the wireless peripheral device 352 to the managed information handling system 300 and may be discarded or deleted. Additionally, in an embodiment, the pairing of the managed information handling system 300 with the wireless peripheral device 352 includes the managed information handling system 300 and wireless peripheral device 352 establishing session keys thereby providing a secure BT wireless link for securely communicating and pairing with each other. At this point the method 301 ends with the managed information handling system 300 and wireless peripheral device 352 being paired until one or both are powered down.

Figure 4A:
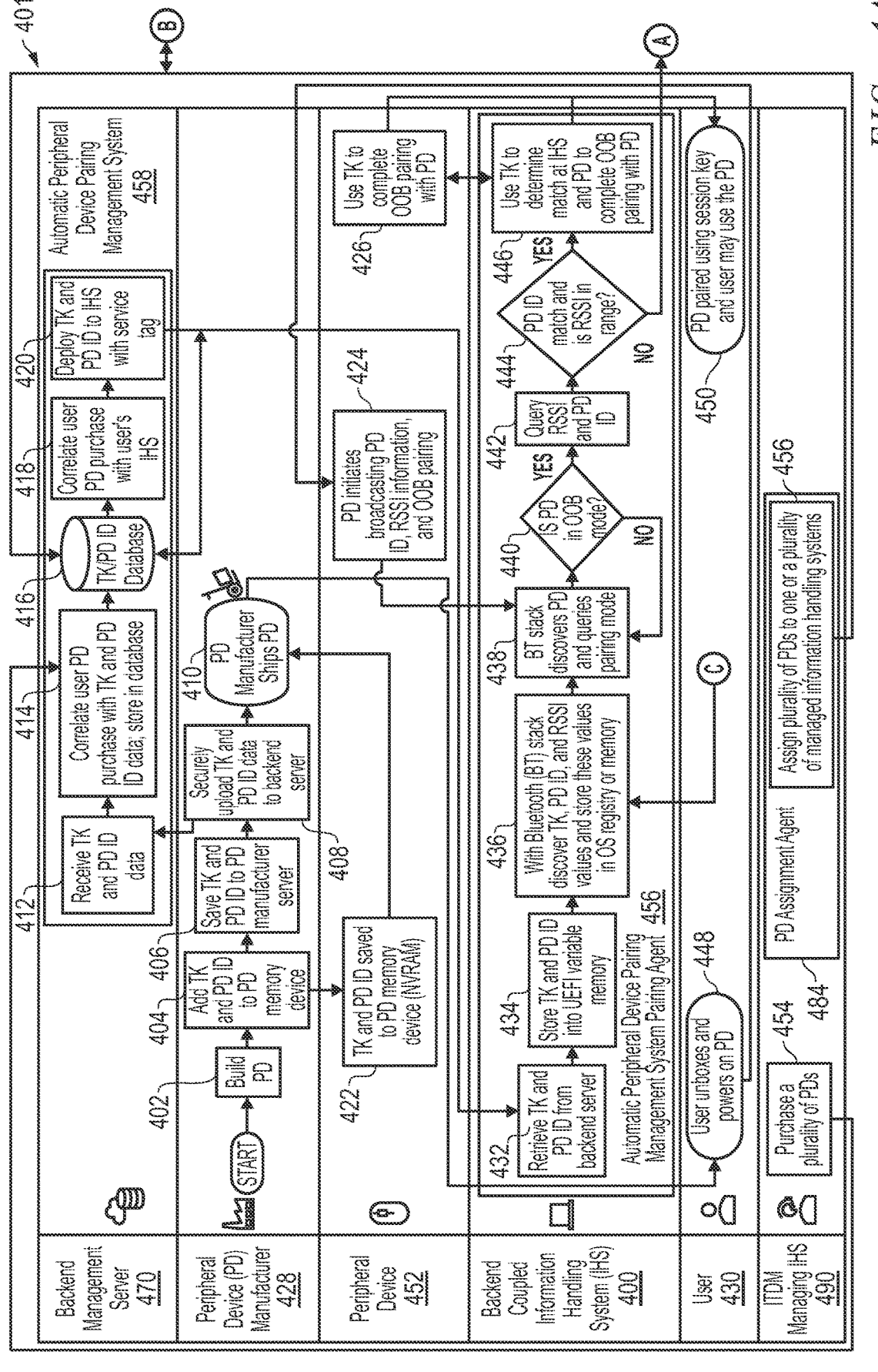
FIGS. 4A and 4B is a process flow diagram of a method of assigning a plurality of wireless peripheral devices with a managing information handling system to a designated subset of managed information handling systems for automatic querying, verification and Bluetooth® pairing according to an embodiment of the present disclosure.
Figure 4B:
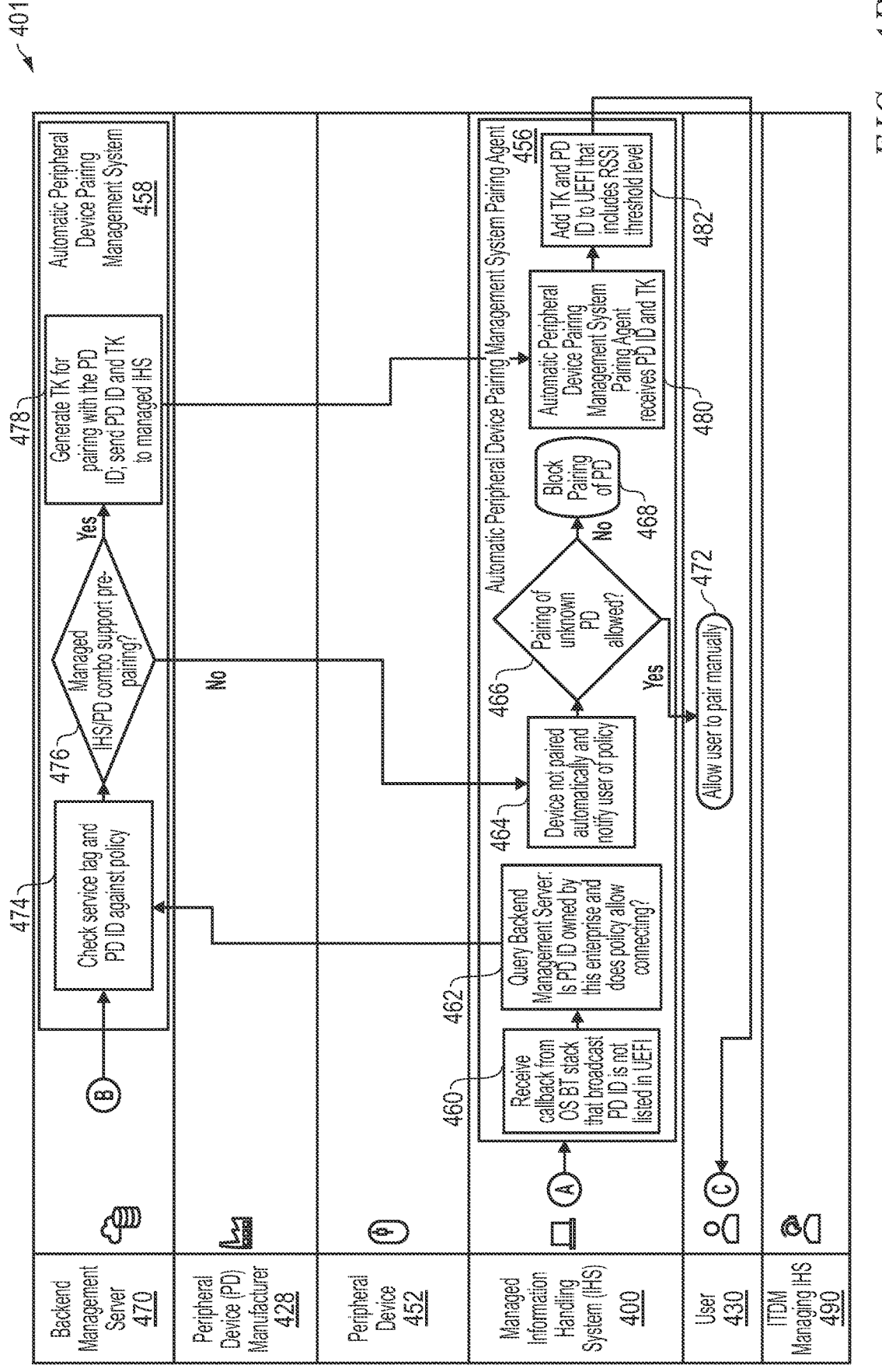

FIG. 4A is a process flow diagram of a method 401 of assigning a plurality of wireless peripheral devices 452 with an ITDM managing information handling system 490 or a backend management server 470 to a subset of managed information handling systems 400 for automatic querying, verification and BT pairing according to an embodiment of the present disclosure. FIG. 4B is a continuation of the process flow diagram of FIG. 4A. FIGS. 4A and 4B show a number of devices and entities operating together to coordinate automatic discovery, verification, and initiation of BT pairing of the managed information handling system 400 with the wireless peripheral device 452 securely via execution of code instructions of an automatic peripheral device pairing management system 458 on the backend management server 470 and an automatic peripheral device pairing management system pairing agent 456 on the managed information handling system 400 assisted by the operation of a PD assignment agent 484 executed on the backend management server 470, at an ITDM managing information handling system 490, or some combination and operated by a user or the ITDM.

In an embodiment, the method 401 may start with a wireless PD manufacturer 428 building the wireless peripheral device 452 at block 402. In an embodiment, the wireless PD manufacturer 428 may be any manufacturer and may be part of the corporation or entity that operates the backend management server 470. Alternatively, the wireless PD manufacturer 428 may be a different entity than the entity that operates the backend management server 470 with the wireless PD manufacturer 428 and the operator of the backend management server 470 having a business relationship as described herein.

As described herein, the wireless peripheral device 452 manufactured by the wireless PD manufacturer 428 may be any type of wireless peripheral device 452 that is to be paired with the managed information handling system 400. In an embodiment, the wireless peripheral device 452 may be a wireless mouse, a wireless keyboard, a wireless external monitor, a wireless trackpad, a wireless tenkey pad, a wireless digital pen, and the like. For ease of understanding, one example wireless peripheral device described in connection with FIG. 4 may be described as a wireless mouse. However, the present specification contemplates that the principles described herein equally apply to any type of wireless peripheral device 452.

During the manufacturing process of the wireless peripheral device 452 at 402, the wireless PD manufacturer 428 may assign a PD ID to the wireless peripheral device 452. In an embodiment, the PD ID assigned to the wireless peripheral device 452 may be a serial number or other unique identification that allows each particular wireless peripheral device 452 to be distinguished from all other peripheral device manufactured by the wireless PD manufacturer 428. It is appreciated, however, that other identification data may be used as the PD ID apart from a serial number and the present specification contemplates those other types of identification data used to uniquely identify the wireless peripheral device 452 via a PD ID.

At block 404, the wireless PD manufacturer 428 may add the PD ID to a memory device of the wireless peripheral device 452. In an embodiment, the memory device may be any type of non-volatile memory device that securely maintains the PD ID prior to pairing with the managed information handling system 400 as described herein. Along with the PD ID, the wireless PD manufacturer 428 may cause a temporary key to be stored on the non-volatile memory of the wireless peripheral device 452. In an embodiment, the wireless PD manufacturer 428 may execute, with a hardware processing resource, a random number generator, a hash function, a cryptographic hash function, or any other cryptographic key generating algorithm that creates a unique temporary key to be associated with the wireless peripheral device 452 and its assigned PD ID and stored on the wireless PD 452. In an embodiment, the PD ID may be used as seed data used by the executed random number generator, a hash function, a cryptographic hash function, or any other cryptographic key generating algorithm to generate the temporary key. This allows the generated temporary key to be unique to the wireless peripheral device 452. Alternatively, the operator (e.g., Dell® Incorporated or other system management services provider) of the backend management server 470 may generate and provide the unique temporary key to the wireless PD manufacturer 428 of manufactured wireless PDs 452 purchased for and assigned to managed information handling systems 400 as notification of those wireless PDs 452 is provided to the backend management server 470. Here, the wireless PD manufacturer 428 may first provide the PD ID or a copy of the PD ID to the backend management server 470 for generation of the temporary key as described herein. In an embodiment, the operator of the backend management server 470 may execute, with a hardware processing resource at the backend management server, a random number generator, a hash function, a cryptographic hash function, or any other cryptographic key generating algorithm that creates the unique temporary key to be associated with the wireless peripheral device 452 and its assigned PD ID. In an embodiment, the PD ID received from the wireless PD manufacturer 428 at the backend management server 470 may be used as seed data by the executed random number generator, hash function, cryptographic hash function, or any other cryptographic key generating algorithm to generate the temporary key. In an embodiment, the operator of the backend management server 470 may then send the generated temporary key back to the wireless PD manufacturer 428 for the wireless PD manufacturer 428 to include it with the PD ID on the non-volatile memory at 422 of the wireless peripheral device 452. Therefore, at block 404, the generated temporary key is also assigned to the wireless peripheral device 452. It is appreciated that the transmission of the temporary key and PD ID from any entity described herein includes the transmission of this data using secure process such as security protocols including hypertext transfer protocol secure (HTTPS) using transport layer security (TLS) protocols and the like. This secure transmission of the temporary key and PD ID from one entity to another prevents, for example, third-party entities from retrieving either the PD ID or temporary key.

As described herein, the wireless PD 452 manufacturer 428 may then store any received temporary keys at 404 in a storage device on the non-volatile memory device at 422 of the wireless peripheral device 452. In an embodiment, the non-volatile memory device may be a secure memory device that prevents third-party entities from gaining access to the PD ID and temporary key.

At block 406, the wireless PD manufacturer 428 may save the PD ID and temporary key set assigned to each wireless peripheral device 452 on a data storage device associated with the wireless PD manufacturer 428. This is done so that, as each wireless peripheral device 452 is purchased, the wireless PD manufacturer 428 may have access to the PD ID and temporary key assigned to each individual wireless peripheral device 452. In some embodiments herein, this temporary key and PD ID data stored on a data storage device associated with the wireless PD manufacturer 428 may be accessed later should the wireless peripheral device 452 be reused by a managed information handling system 400 not assigned to the wireless peripheral device 452.

As each of the individual wireless peripheral devices 452 are sold by the wireless PD manufacturer 428, the wireless PD manufacturer 428 may, at block 408, securely upload a copy of the temporary key and PD ID data to the backend management server 470. The secure connection between the database associated with the wireless PD manufacturer 428 and the backend management server 470 may include any type of security protocols including hypertext transfer protocol secure (HTTPS) using transport layer security (TLS) protocols and the like. Again, this layer of security prevents third parties from gaining access to the PD ID and temporary key as well as other data described herein. In an example embodiment, further data accompanying the copy of the PD ID may include data describing the purchaser/user. The data describing the purchaser/user may include a street address, purchase date, a purchaser identification, and other information that allows the backend management server 470 to determine if and which managed information handling system 400 listed within the backend management server database is owned by the purchaser/user of the wireless PD as described herein.

At block 410, the wireless PD manufacturer 428 may package the wireless peripheral device 452 and ship the wireless peripheral device 452 off to the user 430. It is appreciated that, in some embodiments, the wireless peripheral device 452 is shipped to the user 430 at an address provided by the user during a purchase request. The purchase request may be completed by a user via an internet e-commerce store, for example, which requests the user's address for shipment to the user 430. It is also appreciated, however, that other types of methods of ordering the wireless peripheral device 452 by the user 430 may be used by the user 430 and the present specification contemplates these methods. Further, in an embodiment, the user 430 may be a single user purchasing a wireless peripheral device 452 to be paired with the user's managed information handling system 400. In another embodiment, an ITDM may function as a purchasing agent as indicated at block 454 for one or more user's 430 of a plurality of managed information handling systems 400 as described herein. For ease of understanding, the user 430 in FIGS. 4A and 4B is an ITDM that is operating the an ITDM managing information handling system 490 in order to interface with the executed PD assignment agent executed on the backend management server 470 and in part at the ITDM managing information handling system 490 to assign specific wireless peripheral devices 452 to specific managed information handling systems 400 as described herein. However, the present specification contemplates that a single user may also function as a purchasing agent to purchase the wireless peripheral device 452 or multiple wireless peripheral devices 452 to be used on the managed information handling system 400 or a plurality of managed information handling systems 400.

Turning to block 412, the backend management server 470 receives the temporary key and PD ID from the wireless PD manufacturer 428. Along with the PD ID and temporary key, other temporary key and device identification data may be provided by the wireless PD manufacturer 428 to the automatic PD pairing management system 458. As described herein, this additional data my include data describing the purchaser/user may include a street address, purchase date, a purchaser identification, and other information that allows the backend management server 470 to determine if and which information handling system listed within the backend management server database is owned by the purchaser/user of the wireless PD as described herein.

The method 401 further includes, at block 414, executing code instructions of the automatic peripheral device pairing management system 458 to correlate the purchase of the wireless peripheral device 452 with the user and the temporary key and device identification data (e.g., PD ID and temporary key associated with the purchased wireless peripheral device 452). This data may then be stored in a temporary key/PD ID database at block 416 for later retrieval by the backend management server 470 with execution of the automatic peripheral device pairing management system 458. At this point, the managing information handling system 490 may be notified that the temporary key and PD ID associated with one or a plurality of wireless peripheral devices 452 has been received and stored at the backend management server 470 and its database.

At block 456, the user (e.g., ITDM) of the managing information handling system 490 or backend management server 470 may proceed to assign a plurality of wireless peripheral devices 452 to one or more managed information handling systems 400 in a designated subset of managed information handling systems 400. As described herein, the managing information handling system 490 or backend management server 470 may execute computer readable program code of a PD assignment agent 484 with a hardware processor in order to access the data presented by the backend management server database, indicate, via a GUI, which PDs 452 are to be assigned to which managed information handling systems 400 in the designated subset of managed information handling systems 400, and provide instructions as to which sets of TK and PD IDs are to be sent to which managed information handling systems 400 and how that data is to be transmitted and stored on the managed information handling systems 400. It is appreciated that the computer readable program code of the PD assignment agent 484 is stored and executed on the backend management server 470 and the ITDM operating, for example, a managing information handling system 490 or backend management server 470, may interface with the execution of the PD assignment agent 484.

For example, the execution of the PD assignment agent 484 may provide policy data indicating where each of the managed information handling systems 400 are to store the PD ID and TKs, how the backend management server 470 is to securely transmit the PD IDs and TKs to the managed information handling systems 400, as well as set forth various other pairing requirements such as the RSSI threshold to be used during the pairing process of the wireless peripheral device 452 with the managed information handling system 400. The present specification contemplates that other policies may be developed and presented to the backend management server 470 and pushed down to each managed information handling system 400 for execution of those policies.

In an embodiment, at block 418, the backend management server 470 may cross-reference the purchasing data identifying the purchaser with user data maintained by the backend management server database 416 on the backend management server 470. This correlation allows the backend management server 470 to determine whether the purchaser of the wireless peripheral device 452 is a user of a managed information handling system 400 in the designated subset of managed information handling systems 400. Where the purchaser is not a user of a managed information handling system 400 in the designated subset of managed information handling systems 400, as determined at the backend management server database 416, the backend management server 470 may ignore the PD ID and temporary key received from the PD manufacturer 428.

Where an identifying match between the purchaser and the user is determined at block 418 by the execution of code instructions of the automatic peripheral device pairing management system 458, the backend management server 470 may be instructed by the ITDM operating the PD assignment agent 484 to transmit, securely, the PD ID and temporary key to an automatic peripheral device pairing management system pairing agent 456 at one or more managed information handling system 400 in the designated subset of managed information handling systems 400, and more specifically to a managed information handling system 400 assigned to a particular user in that designated group. As described herein, at block 420, the backend management server 470 deploys the temporary key and PD ID to the automatic peripheral device pairing management system pairing agent 456 at the managed information handling system 400 with, in an embodiment, a service tag. This service tag may be deployed during execution of (e.g., via a hardware processor of the backend management server 470) a software agent (e.g., Dell® SupportAssist®) including automatic peripheral device pairing management system pairing agent 456 that detects the online presence of the user's managed information handling system 400 and initiates a data transfer session. The managed information handling system 400 may also execute a software agent (e.g., Dell® SupportAssist®) that interfaces with the backend management server 470 as described herein.

Turning to block 432, the automatic peripheral device pairing management system pairing agent 456 at a particular managed information handling system 400 among a designated subset of managed information handling systems 400 retrieves the temporary key and PD ID from the backend management server 470 during this transmission. In an embodiment, execution of code instructions of the automatic peripheral device pairing management system pairing agent 456 may control the automatic verification and pairing of a wireless peripheral device 452 described in embodiments herein including the receipt and storage of the PD ID and temporary key on the managed information handling system 400. In an embodiment, the PD ID and temporary key may be stored, at block 434, in UEFI memory device as UEFI variable data. This storage of the PD ID and TK in the UEFI storage may be part of the policy developed by the backend management server 470 as described herein. In the present specification, the UEFI memory device is an example of a type of memory device where the PD ID and TK may be stored. However, the present specification also contemplates that any memory device may be used to maintain the PD ID and temporary key securely at block 434 until an OS BT stack accesses this data.

The execution of code instructions of the automatic peripheral device pairing management system pairing agent 456 by the hardware processor may instruct the OS BT stack to discover the PD ID and temporary key values on the UEFI and store this data in an OS registry or memory in preparation for the automatic discovery, verification, and initiation of BT pairing of the managed information handling system 400 with the wireless peripheral device 452 at block 436. It is appreciated that a hardware processing resource (e.g., a hardware processor, an embedded controller, a CPU, a GPU, etc.) executes computer readable program code of the automatic peripheral device pairing management system pairing agent 456 to perform these processes associated with the operation of the OS BT stack and the automatic discover, verification, and initiation of BT pairing of the managed information handling system 400 with the wireless peripheral device 452.

The method 401 includes, at block 438, the hardware processing resource executing computer readable program code of the OS BT stack to cause the OS BT stack to discover the wireless peripheral device 452 and query the pairing mode. This discovery of the wireless peripheral device 452 is in response to the user 430 unboxing the wireless PD 452 and powering on the wireless PD manufacturer 428 at block 448. This causes, at block 424, the wireless peripheral device 452 to initiate a broadcasting process where the wireless peripheral device 452 broadcasts the PD ID and RSSI transmission level information in an OOB BT broadcast communication pursuant to a Bluetooth OOB pairing protocol, a legacy BLE OOB pairing, a Bluetooth Low Energy (BLE) GOB pairing protocol, or any other suitable protocol to pair the wireless peripheral device 452 to the managed information handling system 400.

The method 401 further includes determining whether the wireless peripheral device 452 is in an OOB mode seeking to be discovered and paired under a BT protocol. Where the wireless peripheral device 452 is not operating under an OOB mode at block 440, the method returns to block 438. Where the wireless peripheral device 452 is operating under an OOB mode and broadcasting a pairing initiation query, the method continues at block 442 with the automatic peripheral device pairing management system pairing agent 456, via the OS BT stack, querying the RSSI signal data levels and PD ID from the wireless peripheral device 452.

The broadcasting of the PD ID for the pairing wireless PD 452 to with the managed information handling system 400 may be conducted via a Bluetooth radio on an OOB BT broadcast communication of the wireless peripheral device 452 as instructed by a hardware processing resource on the wireless peripheral device 452. In an embodiment, a hardware controller on the wireless peripheral device 452 controls the execution of computer readable program code used to initiate the Bluetooth radio and execute the computer readable program code used to query, verify, and initiate and conduct the pairing process with the managed information handling system 400 as described herein.

At block 444, the OS BT stack may engage in verifying whether the PD ID received from the broadcast by the peripheral device matches the PD ID received from the backend management server 470, stored on the UEFI memory device or other memory device, and accessed by the OS BT stack of the managed information handling system 400.

Where, at block 444, it is determined that the PD ID broadcasted by the wireless peripheral device 452 matches the PD ID accessed by the OS BT stack, the verification and initiation of the BT pairing process by the automatic peripheral device pairing management system pairing agent 456 may continue with the OS BT stack also checking RSSI transmission level data from the peripheral device. Again, this RSSI transmission level data may determine whether the wireless peripheral device 452 is close enough to be paired with the managed information handling system 400. Again, the wireless peripheral device 452 is configured to also broadcast the RSSI data that is received indicating the signal power level being received by the receiving radio at the managed information handling system 400 from the wireless PD 452 reaches a specified RSSI threshold level provided in some embodiments. In those examples where an ITDM has ordered a plurality of wireless peripheral devices 452 to be wirelessly paired with any of a plurality of managed information handling systems 400 within the enterprise or corporation, the RSSI data levels provided from the wireless peripheral device 452 may be used to meet the RSSI threshold level and prevent simultaneous pairing of multiple wireless peripheral devices 452 of the same type with the managed information handling system 400 based on wireless range and meeting RSSI threshold levels at the managed information handling system 400.

At block 444, the OS BT stack, under direction of a hardware processing device, may compare the RSSI levels received from the peripheral device to the RSSI threshold data received from the UEFI memory device by the OS BT stack. Where the RSSI level received from the wireless peripheral device 452 meets or exceeds the RSSI threshold data, the automatic verification and initiation of the BT pairing process by the automatic peripheral device pairing management system pairing agent 456 continues with the OS BT stack of the managed information handling system 400 and the wireless peripheral device 452 using the cipher algorithm such as a confirm value generation function for comparing decrypted reciprocally-exchanged data via encryption or decryption with the temporary keys at block 446. The temporary keys use the OOB communication channel to establish and securely pair the wireless peripheral device 452 to the managed information handling system 400. Again, in an embodiment, the BT pairing process may use a Bluetooth OOB pairing protocol, a legacy BLE OOB pairing protocol, a BLE GOB pairing protocol, or any other suitable protocol to determining matching PD IDs and temporary keys and then establish this session key and BT pair the wireless peripheral device 452 to the managed information handling system 400 in a BT wireless link.

In one embodiment, the managed information handling system 400 and wireless peripheral device 452 can each provide various pairing verification communications that includes using the temporary keys generate an encrypted data message with the cipher algorithm, such as a confirm value generation function, and generating a pairing response encrypted value to determine that the temporary keys at each location match. In an embodiment, the managed information handling system 400 may determine and encrypt an Mconfirm value with the cipher algorithm such as the confirm value generation function, provide the encrypted Mconfirm value to the wireless peripheral device 452 for decryption there with the copy PD temporary key. In an embodiment the wireless peripheral device 452 may then generate an Sconfirm value with the cipher algorithm such as the confirm value generation function and encrypt the same with the PD temporary key and respond with the encrypted Sconfirm value to the managed information handling system 400. The managed information handling system 400 may decrypt the received Sconfirm message value and compare it. Where the values match (e.g., Mconfirm=Sconfirm), the BT pairing process proceeds to establish a BT session key pursuant to the standard for the BT wireless link. The BT pairing is completed between the wireless peripheral device 452 and managed information handling system 400 at block 450 with the establishment of a session key between the information handling system and the peripheral device. In an embodiment, once the wireless peripheral device 452 is paired with the managed information handling system 400, the temporary key is no longer used and may be discarded or deleted. The single use of the temporary key in an embodiment may increase the security of the BT pairing process allowing for the creation of a session key once the temporary key has initially been used. Once paired, later session may be initiated if and when the information handling system and/or wireless peripheral device 452 have been powered down and powered up. Thus, in an embodiment, the pairing of the managed information handling system 400 with the wireless peripheral device 452 includes the managed information handling system 400 and wireless peripheral device 452 using an OOB protocol to query, verify, and initiate, BT pairing to then establish session keys thereby securely communicating and pairing with each other. At this point the method 401 ends with the managed information handling system 400 and wireless peripheral device 452 being paired until one or both are powered down.

In some instances, the PD ID from the broadcast of the wireless peripheral device 452 does not match the PD ID accessed by the OS BT stack. In this example embodiment, the pairing request from the wireless peripheral device 352 is ignored, prevented, or otherwise disregarded and the method 401 returns to block 438 in one embodiment. In this embodiment, the PD ID from the broadcast of the wireless peripheral device 452 not matching the PD ID accessed by the OS BT stack may indicate that that particular wireless peripheral device 452 has not been assigned to that particular managed information handling system 400. In this particular example embodiment, the ITDM may have accessed the backend management server 470 via the software agent (e.g., Dell® SupportAssist®) and assigned specific wireless peripheral devices 452 to specific managed information handling systems 400 within an enterprise or corporation and the currently broadcasting wireless peripheral device 452 with the unmatched PD ID 468 had not been assigned to the managed information handling system 400. It is also appreciated that multiple sets of temporary keys and PD IDs may have been saved in the UEFI memory device and accessed by the OS BT stack. In this example embodiment, the mismatch of the broadcasted PD ID from the wireless peripheral device 452 may indicate that the wireless peripheral device 452 was assigned to another managed information handling system and not this particular managed information handling system 400 or, potentially, not assigned to any particular managed information handling system 400 within the enterprise or corporation.

In an alternative embodiment wherein, at block 444, the PD ID from the broadcast of the wireless peripheral device 452 does not match the PD ID accessed by the OS BT stack, the method may continue (via "A") to block 460 in FIG. 4B in order to resolve this unmatching of PD IDs. At block 460, the managed information handling system 400, executing the automatic peripheral device pairing management system pairing agent 456 via the hardware processor, may receive indication that a callback from the OS BT stack indicating that the PD ID received from the broadcast of the wireless peripheral device 452 did not match with a PD ID listed in the UEFI memory device and accessed by the OS BT stack. At this point, at block 462, the managed information handling system 400 may query (e.g., via a service tag) the backend management server 470 to determine if the PD ID is owned by the enterprise (e.g., is listed as a PD ID on the backend management server database) and if the policy provided by the backend management server 470 allows for pairing of the wireless peripheral device 452 to this managed information handling system 400. At block 474, the backend management server 470 may retrieve a service tag assigned (via "B") from block 474 in FIG. 4B to the TK/PD ID database 416 in FIG. 4A. The backend management server 474 at block 474 checks the service tag issued from the managed information handling system 400 and checks the PD ID against the policy generated by the backend management server 470. At block 476, the backend management server 470 determines whether the managed information handling system 400 supports pre-pairing of the wireless peripheral device 452 as indicated by the PD ID.

Here, where a matching PD ID is not found and/or the policy does not allow for pairing of unknown wireless peripheral devices 452, the wireless peripheral device 452 may or may not allow for the pairing process to continue. For example, where, at block 476, it is determined that there is no matching PD ID was found on the backend management server database by the backend management server 470, the backend management server 470 may direct the managed information handling system 400 to not automatically pair with the wireless peripheral device 452 and notify the user of the policy at block 464. This policy, however, may or may not allow for pairing of unknown wireless peripheral devices 452 with the managed information handling system 400 manually. At block 466, therefore, the managed information handling system 400 may access the policy to determine whether pairing of unknown wireless peripheral devices 452 to the managed information handling system 400 is allowed. Where, at block 466, the managed information handling system 400 determines that pairing of unknown wireless peripheral devices 452 is not allowed, the method 401 ends at block 468 with the automatic peripheral device pairing management system pairing agent 456 preventing or blocking the pairing of the wireless peripheral device 452 to the managed information handling system 400. Where pairing of unknown PDs with the managed information handling system 400 is allowed at block 466, the method 401 may end with the user being allowed to manually pair the wireless peripheral device 452 with the managed information handling system 400 at block 472.

In an embodiment, at block 476, where the backend management server 470 has determined that the PD ID broadcasted by the wireless peripheral device 452 is matched with a PD ID on the backend management server database, the backend management server 470 may then generate a TK for the pairing of the wireless peripheral device 452 to the managed information handling system 400. Again, the operator of the backend management server 470 (or the execution of the automatic peripheral device pairing management system 458) may execute, with a hardware processing resource at the backend management server, a random number generator, a hash function, a cryptographic hash function, or any other cryptographic key generating algorithm that creates the unique temporary key to be associated with the PD ID received from the managed information handling system 400. In an embodiment, the PD ID received from the managed information handling system 400 at the backend management server 470 may be used as seed data by the executed random number generator, hash function, cryptographic hash function, or any other cryptographic key generating algorithm to generate the temporary key. In an embodiment, the operator of the backend management server 470 or execution of the automatic peripheral device pairing management system 458 may then send the generated temporary key back to the managed information handling system 400 for initiation of the pairing process.

At block 480, the automatic peripheral device pairing management system pairing agent 456 of the managed information handling system 400 receives the PD ID and generated TK form the backend management server 470. Again, the transmission of the PD ID and TK from the backend management server 470 to the managed information handling system 400 may be done using a secure process such as security protocols including hypertext transfer protocol secure (HTTPS) using transport layer security (TLS) protocols and the like. This secure transmission of the temporary key and PD ID from one entity to another prevents, for example, third-party entities from retrieving either the PD ID or temporary key.

At block 482, the received TK and PD ID are saved into the UEFI memory device for later access by the OS BT stack as described herein. In an embodiment, the UEFI memory device may further include the RSSI threshold level data indicating the RSSI threshold level that is to be met in order for the wireless peripheral device 452 to be paired with the managed information handling system 400 as described herein. The method 401 (via "C" in FIGS. 4B and 4A) returns to block 436 on FIG. 4A for the process to continue as described in embodiments herein in order to automatically verify with the temporary keys and BT pair the wireless peripheral device 452 to the managed information handling system 400.

The blocks of the flow diagrams of FIGS. 3 and 4A and 4B or steps and aspects of the operation of the embodiments herein and discussed above need not be performed in any given or specified order. It is contemplated that additional blocks, steps, or functions may be added, some blocks, steps or functions may not be performed, blocks, steps, or functions may occur contemporaneously, and blocks, steps, or functions from one flow diagram may be performed within another flow diagram.

Devices, modules, resources, or programs that are in communication with one another need not be in continuous communication with each other, unless expressly specified otherwise. In addition, devices, modules, resources, or programs that are in communication with one another can communicate directly or indirectly through one or more intermediaries.

Although only a few exemplary embodiments have been described in detail herein, those skilled in the art will readily appreciate that many modifications are possible in the exemplary embodiments without materially departing from the novel teachings and advantages of the embodiments of the present disclosure. Accordingly, all such modifications are intended to be included within the scope of the embodiments of the present disclosure as defined in the following claims. In the claims, means-plus-function clauses are intended to cover the structures described herein as performing the recited function and not only structural equivalents, but also equivalent structures.

The above-disclosed subject matter is to be considered illustrative, and not restrictive, and the appended claims are intended to cover any and all such modifications, enhancements, and other embodiments that fall within the scope of the present invention. Thus, to the maximum extent allowed by law, the scope of the present invention is to be determined by the broadest permissible interpretation of the following claims and their equivalents, and shall not be restricted or limited by the foregoing detailed description.

What is claimed is:

1. An information handling system operating as a backend management server comprising:

a hardware processor;

a memory device;

a power management unit (PMU) to provide power to the hardware processor and memory device;

the hardware processor executing computer readable program code of an automatic peripheral device pairing management system to generate a temporary key and receive a peripheral device identification (PD ID) for each of a plurality of wireless peripheral devices ordered by an information technology decision maker (ITDM);

the hardware processor executing the computer readable program code of the automatic peripheral device pairing management system to send the generated temporary keys to a manufacturer of each of the plurality of wireless peripheral devices for the manufacturer to cause each of the temporary keys to be stored on a corresponding memory device on each of the plurality of wireless peripheral devices;

the hardware processor to receive, via execution of computer readable program code of a peripheral device assignment agent, a pairing assignment instruction for the plurality of wireless peripheral devices to a designated subset of managed information handling systems within an enterprise from selections made by an information technology decision maker (ITDM); and the hardware processor executing the computer readable program code of the automatic peripheral device pairing management system to deliver each of the temporary keys and PD IDs associated with each of the plurality of the wireless peripheral devices to the designated subset of managed information handling systems to be used to automatically query, verify the temporary key at both the wireless peripheral devices and corresponding managed information handling systems, and Bluetooth® (BT) pair using individual session keys for secure communications at each of the plurality of wireless peripheral devices with managed information handling systems that have been automatically paired in the designated subset of managed information handling systems.

2. The information handling system of claim 1 further comprising:

a network interface device to send instructions to the managed information handling system describing peripheral device verification requirements, the temporary key, and the PD ID via a secured backend link.

3. The information handling system of claim 1 further comprising:

the hardware processor executing the computer readable program code of the automatic peripheral device pairing management system to generate the temporary key for each of the plurality of wireless peripheral devices via a hash function with a serial number of each of the associated peripheral devices used as seed data into the hash function.

4. The information handling system of claim 1 further comprising:

the hardware processor to assign the temporary keys and PD IDs associated with each of the plurality of peripheral devices ordered by the ITDM to all of the subset of managed information handling systems based on selection via the peripheral device assignment agent to enable any managed information handling systems in the designated subset of managed information handling systems to automatically BT pair with any of the plurality of wireless peripheral devices.

5. The information handling system of claim 1 further comprising:

the hardware processor to execute the computer readable program code of the automatic peripheral device pairing management system to send a received signal strength indicator (RSSI) threshold to each of the managed information handling systems and instructions directing each of the managed information handling systems to automatically verify and BT pair a querying wireless peripheral device when any of the plurality of peripheral devices provides received signal strength indicator (RSSI) above the RSSI threshold level.

6. The information handling system of claim 1 wherein sending temporary keys and PD IDs associated with the plurality of wireless peripheral devices to a managed information handling system includes transmitting the temporary key and PD ID via an encrypted communication channel.

7. The information handling system of claim 1 further comprising:

the hardware processor receiving selections by the ITDM to, via execution of the peripheral device assignment agent to exclude a number of the managed information handling systems to determine the designated subset of managed information handling systems being assigned a peripheral device of the plurality of peripheral devices.

8. The information handling system of claim 1 further comprising:

the hardware processor receiving selection by the ITDM, via execution of the peripheral device assignment agent, of the pairing assignment instruction for a single peripheral device of the plurality of peripheral devices:

to be BT paired with a managed information handling system of the designated subset of managed information handling systems; or to be BT paired with a plurality of managed information handling systems of the designated subset of managed information handling systems.

9. The information handling system of claim 1 further comprising:

the hardware processor receiving selection by the ITDM, via execution of the PD assignment agent, of the pairing assignment instructions for many peripheral devices of the plurality of peripheral devices to a single managed information handling system of the designated subset of managed information handling systems.

10. An information handling system operating as a back-end management server comprising:

a hardware processor;

a memory device;

a power management unit (PMU) to provide power to the hardware processor and memory device;

the hardware processor executing computer readable program code of an automatic peripheral device pairing management system to receive a temporary key and receive a peripheral device identification (PD ID) for each of a plurality of wireless peripheral devices ordered by an information technology decision maker (ITDM) from a peripheral device manufacturer;

the hardware processor executing the computer readable program code of the automatic peripheral device pairing management system to send the received temporary keys from the manufacturer of each of the plurality of wireless peripheral devices, where the manufacturer causes a copy of each of the temporary keys to be stored on a corresponding memory device on each of the plurality of wireless peripheral devices;

the hardware processor to, via execution of computer readable program code of a peripheral device assignment agent, receive a pairing assignment instruction for the plurality of wireless peripheral devices to a designated subset of managed information handling systems within an enterprise from selections made by an information technology decision maker (ITDM); and the hardware processor executing the computer readable program code of the automatic peripheral device pairing management system to deliver each of the temporary keys and PD IDs associated with each of the plurality of the wireless peripheral devices to the designated subset of managed information handling systems to be used to automatically query, verify the temporary key at both the wireless peripheral devices and corresponding managed information handling systems, and Bluetooth (BT) pair using individual session keys for secure communications at each of the plurality of wireless peripheral devices with managed information handling systems that have been automatically paired in the designated subset of managed information handling systems.

11. The information handling system of claim 10 further comprising:

a network interface device to send instructions to the managed information handling system describing peripheral device verification requirements, the temporary key, and the PD ID via a secured backend link.

12. The information handling system of claim 10 further comprising:

the hardware processor executing the computer readable program code of the automatic peripheral device pairing management system to, via a network interface device, send instructions to each of the managed information handling systems directing each of the managed information handling systems to pair with a querying wireless peripheral device when the querying wireless peripheral device provides received signal strength indicator (RSSI) above an RSSI threshold level.

13. The information handling system of claim 10 further comprising:

the hardware processor to assign the temporary keys and PD IDs associated with each of the plurality of peripheral devices ordered by the ITDM to all of the subset of managed information handling systems based on selection via the peripheral device assignment agent to enable any managed information handling systems in the designated subset of managed information handling systems to automatically verify and BT pair with any of the plurality of wireless peripheral devices.

14. The information handling system of claim 10 wherein sending temporary keys and PD IDs associated with the plurality of wireless peripheral devices to a managed information handling system includes transmitting the temporary key and PD ID via an encrypted communication channel.

15. The information handling system of claim 10 further comprising:

the hardware processor receiving selection by the ITDM to, via execution of the PD assignment agent, to exclude a number of the managed information handling systems to determine the designated subset of managed information handling systems being assigned a peripheral device of the plurality of peripheral devices.

16. The information handling system of claim 10 further comprising:

the hardware processor receiving selection by the ITDM to, via execution of the PD assignment agent, to assign many peripheral devices of the plurality of peripheral devices to any subgroup of managed information handling systems in the designated subset of managed information handling systems.

17. A managing information handling system comprising:

a hardware processor;

a memory device;

a power management unit (PMU) to provide power to the hardware processor and memory device;

a network interface device to receive notice from a backend management server that the backend management server has stored, on a backend management server database, a temporary key and a peripheral device identification (PD ID) associated with each of a plurality of wireless peripheral devices ordered by an information technology decision maker (ITDM) of an enterprise;

the hardware processor to execute the computer readable program code of a peripheral device assignment agent to display a graphical user interface (GUI) for the ITDM to assign Bluetooth (BT) pairing the plurality of peripheral devices to a designated subset of managed information handling systems within the enterprise; and the hardware processor to execute the computer readable program code of the peripheral device assignment agent to send instructions to the backend management server to direct the backend management server to deliver each temporary key and PD ID associated with each of the plurality of wireless peripheral devices to the designated subset of managed information handling systems to enable automatic querying, verification of the temporary key at both the wireless peripheral devices and corresponding managed information handling systems, and BT pairing using individual session keys for secure communications at each of the plurality of wireless peripheral devices with the designated subset of managed information handling systems that have been automatically paired.

18. The managing information handling system of claim 17 further comprising:

the network interface device to send the instructions to the backend management server to direct it to send a temporary key and PD ID matched for each of the plurality of wireless peripheral devices to every managed information handling system in the subset of managed information handling systems from the backend management server to enable verification of any of the plurality of wireless peripheral devices with any managed information handling system in the designated subset of managed information handling systems such that upon the temporary key and PD ID matching peripheral device temporary key and PD ID provided by the peripheral device, the temporary key and peripheral device temporary key are deleted.

19. The managing information handling system of claim 17 further comprising:

the peripheral device assignment agent to receive the pairing assignment instructions from the ITDM to exclude a number of the managed information handling systems to determine the designated subset of managed information handling systems being assigned to the plurality of peripheral devices.

20. The managing information handling system of claim 17 further comprising:

the peripheral device assignment agent to receive the pairing assignment instruction from the ITDM to select to assign specific peripheral devices to individual managed information handling systems or a smaller subgroup of managed information handling systems in the designated subset of managed information handling systems.

* * * * *